(12) United States Patent
Rolf et al.

(10) Patent No.: US 11,159,515 B2
(45) Date of Patent: *Oct. 26, 2021

(54) SYSTEMS AND METHODS FOR INTEGRATING SYSTEMS OVER UNTRUSTED NETWORKS

(71) Applicants: Atlassian Pty Ltd., Sydney (AU); Atlassian Inc., San Francisco, CA (US)

(72) Inventors: Carl Christian Rolf, Sydney (AU); Oliver Burn, Sydney (AU); James Navin, Sydney (AU); Rafal Krzysztof Myslek, Sydney (AU)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/836,615

(22) Filed: Mar. 31, 2020

(65) Prior Publication Data
US 2021/0306316 A1 Sep. 30, 2021

(51) Int. Cl.
  *H04L 9/30* (2006.01)
  *H04L 29/06* (2006.01)
  *G06F 9/54* (2006.01)

(52) U.S. Cl.
  CPC ............ *H04L 63/083* (2013.01); *G06F 9/547* (2013.01); *H04L 63/20* (2013.01)

(58) Field of Classification Search
  CPC ........ H04L 63/083; H04L 63/20; G06F 9/547
  See application file for complete search history.

(56) References Cited

U.S. PATENT DOCUMENTS

| | | | |
|---|---|---|---|
| 7,069,437 B2 | 6/2006 | Williams et al. | |
| 9,497,267 B1* | 11/2016 | Hoarau | H04L 67/42 |
| 9,635,108 B2 | 4/2017 | Thomas et al. | |
| 2003/0126301 A1 | 7/2003 | Mason | |
| 2010/0182918 A1 | 7/2010 | Clevy et al. | |
| 2015/0288760 A1 | 10/2015 | Thomas et al. | |
| 2016/0119351 A1 | 4/2016 | Tamura et al. | |
| 2018/0039501 A1 | 2/2018 | Jain et al. | |
| 2018/0137032 A1* | 5/2018 | Tannous | G06F 8/71 |
| 2019/0075115 A1 | 3/2019 | Anderson et al. | |

* cited by examiner

*Primary Examiner* — Wasika Nipa
(74) *Attorney, Agent, or Firm* — Brownstein Hyatt Farber Schreck, LLP

(57) ABSTRACT

Described herein is a computer implemented method for configuring a receiving system to receive data from a sending system. The method comprises receiving an integration creation request from a client application. In response, a specific integration user account is created with credentials which provide access to the receiving system. The credentials are communicated to the client application. In addition, an integration record comprising details in respect of the integration is created, stored, and associated with the specific integration user account.

18 Claims, 10 Drawing Sheets

1000

Owners table 1002
Tenant ID
General integrations user ID
...

Installations table 1004
Tenant ID
General integrations user ID
Installation ID
...

Specific installation table 1006
Tenant ID
General integrations user ID
Installation ID
Integration ID
Integration name
Sending system resource locator
Integration data type(s)
Integration graphic

...

Integrations table 1010
Tenant ID
General integrations user ID
Installation ID
Integration ID
Specific integration user ID
...

Figure 10

SYSTEMS AND METHODS FOR INTEGRATING SYSTEMS OVER UNTRUSTED NETWORKS

FIELD

The present disclosure is directed to systems and methods for integrating systems over untrusted networks.

BACKGROUND

In modern computing, many situations arise where configuring separate systems to allow for data communication between those systems is desirable. Where systems communicate over untrusted networks, though, two often competing concerns arise: security and convenience. With respect to security, most system integrations will need to be provided in a way that does not expose one or both systems to security threats. Most integrations will also need to operate in a way that ensures any sensitive data involved in either setting up the integration or in use of the integration is secure. With respect to convenience, it is advantageous for integration setup and management processes, and processes for communicating data between integrated systems, to be as simple as possible. The systems and techniques described herein address these competing requirements by integrating various systems over an untrusted network.

Background information described in this specification is background information known to the inventors. Reference to this information as background information is not an acknowledgment or suggestion that this background information is prior art or is common general knowledge to a person of ordinary skill in the art.

BRIEF DESCRIPTION OF THE DRAWINGS

FIG. 10 provides example database tables for storing integration data.

Figure 1:
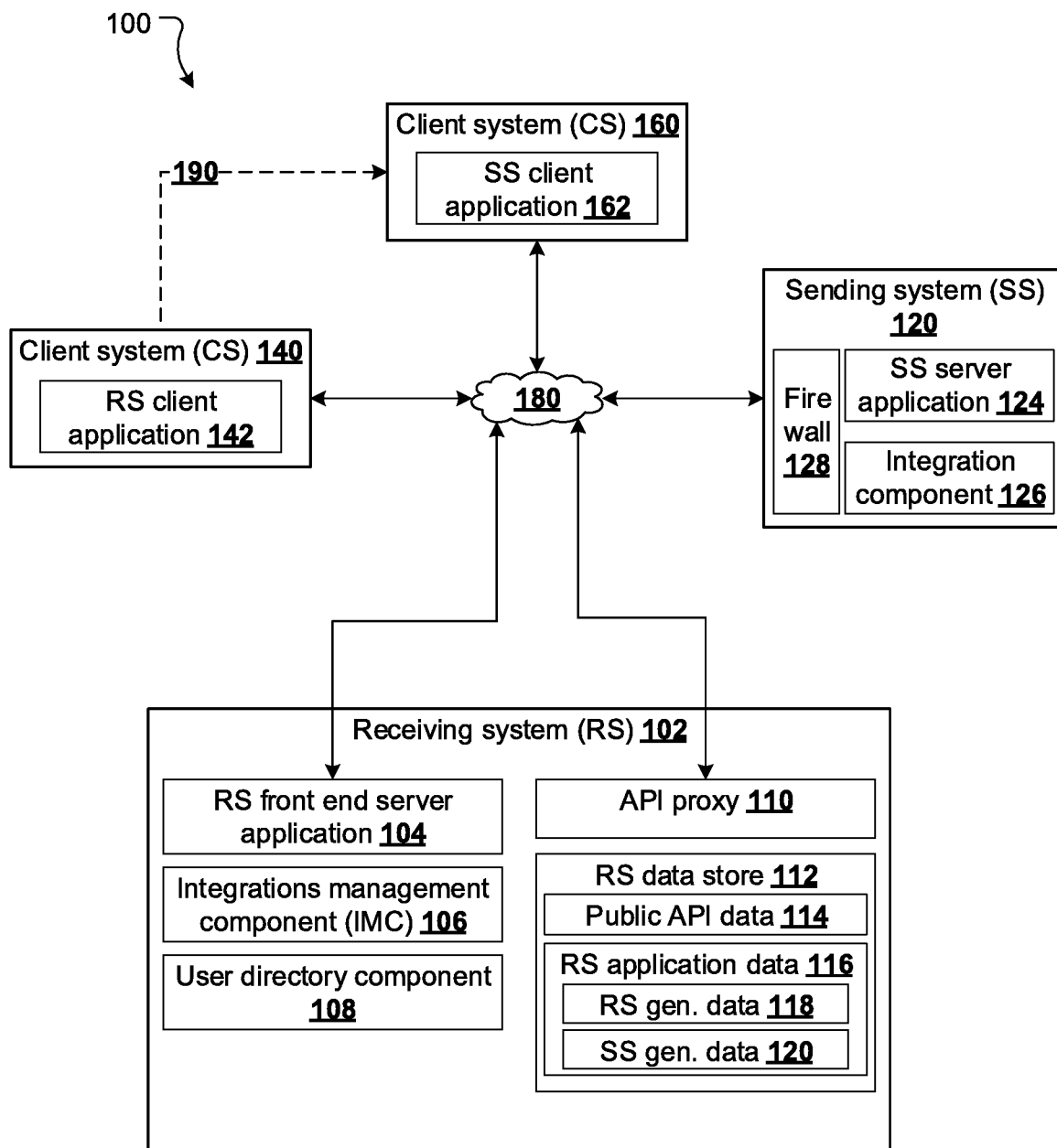
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

This description takes the following outline:
1. Overview
2. Example networked environment
3. Example computer processing system
4. Creating an integration between two systems
5. Communicating data between two integrated systems
6. Receiving system-side integration management
7. Example communication between outgoing and receiving systems

1. Overview

The present disclosure is directed to configuring two systems to allow the communication of data between those systems. This involves setting up one or more integrations.

As used herein, the term integration refers to a mechanism by which a receiving system and a sending system can communicate data. In the present context, a given integration involves configuring both the outgoing and receiving systems. The sending system is configured to access a defined set of application programming interfaces (APIs) provided by the receiving system (RS). Using those APIs, the sending system can communicate defined data to the receiving system (and manage the data it has provided). The receiving system is configured to permit the sending system to access the defined set of APIs, and to receive and process data received from the sending system via those APIs (for example by storing it, displaying it, associating with other receiving system data, further communicating it, and/or processing it in any other useful way).

There are innumerable use cases for such integrations.

As one set of examples, consider an issue tracking system such as Jira made available by Atlassian. Amongst other things, Jira allow users to perform various actions with respect to issues—for example, create issues, associate issues with projects and/or other issues, transition issues between workflow states, add/edit information associated with issues, assign issues to specific people/teams. One common use scenario for an issue tracking system such as Jira is to set up projects corresponding to software products. A person or team who comes up with an idea for a new feature may then create an issue (or set of related issues) for the feature and associate the issue with the relevant project.

As development of the feature progresses (e.g. the feature is planned, developed, built, tested, released, enabled, marketed, supported, etc.), the issue(s) created for the feature transition(s) through various workflow states, with information regarding the progress of the feature being added to the issue by the relevant stakeholders.

While the issue tracking system can be used to track the development progress of a given feature, actual development typically involves a number of other software systems. By way of example: code for the feature may be stored/managed using a version control system (e.g. Bitbucket, Github, or an alternative version control system); integration and/or delivery may be performed using a continuous integration/delivery (CI/CD) system (e.g. Bamboo, Jenkins, or another CI/CD system); features may be released under feature flags managed by a feature flag system (e.g. LaunchDarkly, Rollout, or an alternative feature flag system); a documentation system (for example a wiki system such as Confluence or an alternative documentation system).

In order to improve the software development process, therefore, integrating the various systems used in developing the software is advantageous.

For example, by creating an integration in which the issue tracking system is the receiving system and the CI/CD system is the sending system, the CI/CD system can be configured to automatically communicate CI/CD data regarding the integration/delivery of a feature to the issue tracking system. The issue tracking system receives the incoming data (in this case CI/CD data), determines the issue or issues that data is relevant to, associates the incoming data with that/those issue(s), and stores the incoming data. The issue tracking system can then make use of the stored CI/CD data in downstream operations: for example it can raise alerts based on the CI/CD data, display the CI/CD data (or parts thereof) to a user—e.g. when the user views an issue the data is associated with, and/or perform other operations using the CI/CD data.

In addition, or alternatively, receipt of particular CI/CD data may trigger certain issue tracking system operations (or sequences of operations) to be performed. For example, the issue tracking system can process the CI/CD data received to determine whether it triggers an issue tracking system automation (one or more operations to be automatically performed by the issue tracking system) and, if so, perform that automation. As one example, a trigger may be defined that causes the issue tracking system to transition an issue from one state to another state and notify one or more users that are subscribed to that issue of the CI/CD data received/issue transition.

As another example, by integrating a feature flag system (the sending system) with the issue tracking system (the receiving system), the feature flag system can be configured to automatically communicate feature flag data regarding the roll out or release of a feature to the issue tracking system. Once again, the issue tracking system receives the incoming data (in this case feature flag data), determines the issue or issues that data is associated with, and stores the data for use in downstream operations.

As noted, a given integration provides a sending system access to a defined set of receiving system APIs. Because of this it is possible for there to be multiple integrations between the same pair of incoming and sending systems. Consider again the above example of an integration between an incoming issue tracking system and an outgoing CI/CD system. A single integration may be created to achieve this, the single integration providing the CI/CD system with access to APIs that allow it to communicate (for example) both build data and deployment data to the issue tracking system. Alternatively, two separate integrations may be created: one integration providing the CI/CD system with access to APIs that allow it to communicate build data; another integration providing the CI/CD system with access to APIs that allow it to communicate deployment.

Initially, examples of a networked environment and computer processing system will be provided. Following this, example processes for creating an integration, using an integration to communicate data, and manage integrations are described in turn.

2. Example Networked Environment

FIG. 1 depicts one example of a networked environment 100 in which the various operations and techniques described herein can be performed.

Networked environment 100 includes a receiving system (RS for short) 102, a sending system (SS for short) 120, and two client systems (CS for short) 140 and 160. These systems are interconnected via a public/untrusted communications network 180 (e.g. the Internet).

RS 102 and SS 120 may be any two systems where services provides (and data generated) by the SS 120 are in some way related to services provided by the RS 102. As one example, described above, RS 102 may be an issue tracking system such as Jira and SS 120 may be a CI/CD system such as Jenkins.

RS 102 and SS 120 may be cloud based systems or private systems. In this context, a cloud based system is a system that runs outside the private network (virtual or physical) of an organisation that is using the software services provided by the cloud based system. In contrast, a private system in this context is a system that runs inside a private network (virtual or physical) of the company using the software services of that system.

In the specific examples described herein, RS 102 is a multi-tenanted cloud based system, i.e. a cloud based system that provides software as a service to multiple different tenants/organisations (and runs outside the private networks of those tenants/organisations). RS 120 in the examples described herein is a private system of a given tenant/organisation (running inside the private network of that tenant/organisation).

Furthermore, while a single receiving system and a single sending system have been depicted and described, the techniques described herein can be used to manage multiple integrations. For example: RS 102 may be integrated with any number of different sending systems 120 (i.e. configured to receive data from those sending systems); SS 120 may be integrated with any number of different receiving systems 102 (i.e. configured to send data to those receiving systems); and a given system may be both a receiving system (i.e. receive data from one or more sending systems) and a sending system (i.e. communicate data to one or more receiving systems).

Receiving System (RS) 102

RS 102 is illustrated with various functional components. Although these components are described and depicted separately, the functionality of the components could be provide by fewer, additional, or alternative components to those depicted and described.

One component of RS 102 is an RS front-end server application 104. The RS server application 104 is executed by a computer processing system to configure that system to provide server-side functionality to one or more corresponding client applications (e.g. RS client application 142 described below). The server-side functionality includes 'normal' operational functionality provided by the RS 102. For example, where RS 102 is an issue tracking system such 'normal' functionality may include creating/viewing/editing issues managing users and user permissions, and other issue tracking system operations. As described further below, the server-side functionality also includes (at least for users with appropriate permissions) integration administration functions which, in this case, include setting up, using, and managing integrations with sending systems such as SS 120.

To provide the server-side functionality, the RS server application 104 comprises one or more application programs, libraries, APIs or other software elements that implement the features and functions that are described herein. For example, where the RS client application 142 is a web browser, the RS server application 104 will be a web server such as Apache, IRS, nginx, GWS, or an alternative web server. Where the RS client application 142 is a specific application, the RS server application 104 will be an application server configured specifically to interact with that client application 142. RS 102 may be provided with both web server and application server modules.

In the present example, RS 102 also includes an integrations management component 106 (IMC) 106. As described further below, the IMC 106 performs various operations with respect to creating and managing integrations.

In the present example, RS 102 also includes a user directory component 108. User base component 108 stores account details for the user accounts maintained by RS 102. When external applications or systems (e.g. client applications such as 142, sending system server applications such 124, or any other application/system) attempt to connect to the RS 102 or control RS 102 to perform operations they do so using a user account. The user directory component 108 is responsible for validating user accounts and associated permissions.

In the present example, RS 102 also includes an API proxy 110. API proxy 110 provides access to APIs that the RS 102 makes available to external systems.

In the present example, RS 102 also includes an RS data store 112. RS data store 112 is used to store various data used by RS 102 in the course of its operations. In the present example this data includes public API data 114, and RS application data 116.

The public API data 114 includes data in respect of the APIs the RS 102 makes available to external systems.

The RS application data 116 includes data relevant to the services provided by the RS system 102. In the present disclosure, this data includes RS generated data 118 and SS generated data 120.

The RS generated data 118 is data generated by the RS 102. For example, where the RS system 102 is an issue tracking system, the RS generated data 118 may include configuration type data (e.g. issue types available for a given project, workflows of particular issue types, and any other configuration type data) as well as actual issue data in respect of issues created/managed by the issue tracking system.

The SS generated data 118 is data generated by an SS 120 and communicated to the RS 102 using an integration. For example, if RS 102 is an issue tracking system and SS 120 is a CI/CD system, the SS generated data 120 may include build and or deployment data relating to one or more issues maintained by the RS 102.

The public API data 114 and RS application data 116 have been illustrated as separate data blocks within RS data store 112. These different types of data may, however be maintained by a single data storage application (e.g. a single database) or by separate data storage applications (e.g. separate database) that run on one or on multiple physical data store server computer systems. Similarly, while the RS generated data 118 and SS generated data 120 have been illustrated as separate blocks in FIG. 1, both types of data may be stored in a single data store (i.e. once the SS generated data has been received it is associated with the relevant RS data and stored with it).

In order to provide server side functionality to clients, RS 102 will typically include additional components to those illustrated and described. As one example, RS 102 will typically include one or more firewalls (and/or other network security components) and load balancers (for managing access to the RS server application 104 and API proxy 110).

The RS system 102 components described herein may be implemented by hardware, software (data and computer readable instructions which are stored in memory and executed by one or more computer processing systems), or a combination of hardware and software. The precise hardware architecture of RS 102 will vary depending on implementation, however it will typically include multiple computer processing systems (e.g. server systems) which communicate with one another either directly or via one or more networks, e.g. one or more LANS, WANs, or other networks (with a secure logical overlay, such as a VPN, if required).

As noted, in some implementations the RS 102 maybe a cloud system providing the functionality of the system as a service to clients. In this case RS 102 can be configured to commission/decommission components—such as the front end server application and API proxy 110 (and hardware on which those components execute)—as demand requires.

RS 102 provides services to multiple users (with user account details stored, for example, in user directory component 108).

In the implementations described herein, RS 102 is a multi-tenant system: i.e. RS 102 provides services to users of multiple distinct tenants (keeping each tenant's data separate from the data of each other tenant). In this case, each user account managed by the RS 102 is associated with a tenant identifier that identifies the tenant that the user account belongs to.

In other implementations, however, RS 102 is single-tenancy system: i.e. a system that provides services to users of a single organisation. In this case, all user accounts are associated with that single tenancy/organisation.

Sending System (SS) 120

SS 120 is also illustrated with various functional components. Although these components are described and depicted separately, the functionality of the components could be provide by fewer, additional, or alternative components to those depicted and described.

One component of SS 104 is an SS server application 124. The SS server application 124 is executed by a computer processing system to configure that system to provide server-side functionality to one or more corresponding client applications (e.g. SS client application 162 described below). The server-side functionality includes normal operational functionality provided by the SS 120. For example, where SS 120 is a CI/CD system, such normal functionality may include setting up and running CI/CD pipelines (e.g. accessing code from a code base, building artefacts/executables using the code, running tests, and deploying to one or more environments). As described further below, the SS server-side functionality also includes (at least for users with appropriate permissions) administrative functionality which, in this case, includes setting up integrations with a receiving system such as RS 102.

To provide the server-side functionality, the SS server application 124 comprises one or more application programs, libraries, APIs or other software elements that implement the features and functions that are described herein. For example, where the SS client application 162 is a web browser, the SS server application 124 will be a web server such as Apache, IRS, nginx, GWS, or an alternative web server. Where the SS client application 162 is a specific application, the SS server application 124 will be an application server configured specifically to interact with that client application 162. SS 120 may be provided with both web server and application server modules.

In the present example, SS 120 also includes an integration component 126. As described below, the integration component 126 handles (or configures the SS server application 126 to handle) communication with the RS 102.

Integration component 126 may be software module such as an add-on or plug-in that operates in conjunction with the SS server application 142 to expand the functionality thereof. In alternative embodiments, the functionality provided by the integration component may be natively provided by the SS server application 124 (i.e. the SS server application 124 itself is released with instructions and data which, when executed, cause the SS server 120 to perform the functionality described herein).

In the present example, SS 120 also includes a firewall component 128 to provide security for the SS 120.

In order to provide server side functionality to clients, SS 120 will typically include additional components to those illustrated and described. As one example, SS 120 will typically include some kind of data storage system or component for storing data associated with the functions provided by the SS 120.

The SS system 120 components described herein may be implemented by hardware, software, or a combination of hardware and software. The precise hardware architecture of SS 120 will vary depending on implementation, however it will typically include multiple computer processing systems (e.g. server systems) which communicate with one another either directly or via one or more networks, e.g. one or more LANS, WANs, or other networks (with a secure logical overlay, such as a VPN, if required).

In some implementations the SS 120 maybe a cloud system providing the functionality of the system as a service. In this case, SS 120 can be configured to commission/decommission components (and hardware on which those components execute) as demand requires.

In the implementations described herein SS 120 is a single tenant system. SS 120 may, however, be a multi-tenant system.

Client Systems (CS) 140 and 160

CS 140 hosts an RS client 142 (RS client 142 for short) which, when executed by the CS 140, configures the CS 140 to provide client-side functionality for/interact with the front end server application 104 of the RS 102. Operations performed by the RS client 142 are described further below.

RS client 142 may be a general web browser application (such as Chrome, Safari, Internet Explorer, Opera, or an alternative web browser application) which accesses the RS server application 104 via an appropriate uniform resource locator (URL) and communicates with RS server application 104 via general world-wide-web protocols (e.g. http, https, ftp). Alternatively, the RS client 142 may be a specific application programmed to communicate with RS server application 104 using defined application programming interface (API) calls.

CS 160 hosts an SS client 162 (SS client 162 for short) which, when executed by the CS 160, configures the CS 160 to provide client-side functionality for/interact with the server application 124 of the SS 102. Operations performed by the SS client 162 are described further below.

SS client 162 may be a general web browser application (such as Chrome, Safari, Internet Explorer, Opera, or an alternative web browser application) which accesses the SS server application 124 via an appropriate uniform resource locator (URL) and communicates with SS server application 124 via general world-wide-web protocols (e.g. http, https, ftp). Alternatively, the SS client 162 may be a specific application programmed to communicate with SS server application 124 using defined application programming interface (API) calls.

While RS client 142 and SS client 162 have been described as being on two separate systems (CS 140 and 160 respectively), the RS and SS clients 142 and 162 may—and will often—be installed on a single client system. Furthermore, a client system may have multiple clients installed thereon. For example, a single client system (such as CS 140) could be provided with: a web browser application (capable of use as both RS and SS client 142 and 162), a dedicated RS client 142, and a dedicated SS client 162.

In terms of hardware, each client system 140 and 160 may be any computer processing system which is configured (or configurable) by hardware and/or software to offer client-side functionality. By way of example, either or each of CS 140 and 160 may be a desktop computer, a laptop computer, a netbook computer, a tablet computing device, a mobile/smart phone device, a personal digital assistant, or an alternative computer processing system.

Although not illustrated in FIG. 1, CS 140 and CS 160 will typically have additional applications installed thereon, for example an operating system application such as Microsoft Windows®, Apple SSX, Apple RSS, Android, Unix, or Linux.

3. Example Computer Processing System

Various features and techniques described herein are implemented using one or more computer processing systems.

For example, in networked environment 100 described above, CSs 140 and 160 are both computer processing systems (for example, personal computers, tablet/phone devices, or other computer processing systems). Similarly, the various functional components of RS 102 are implemented using one or more computer processing systems (e.g. server computers or other computer processing systems), as are the various components of SS 120.

Figure 2:
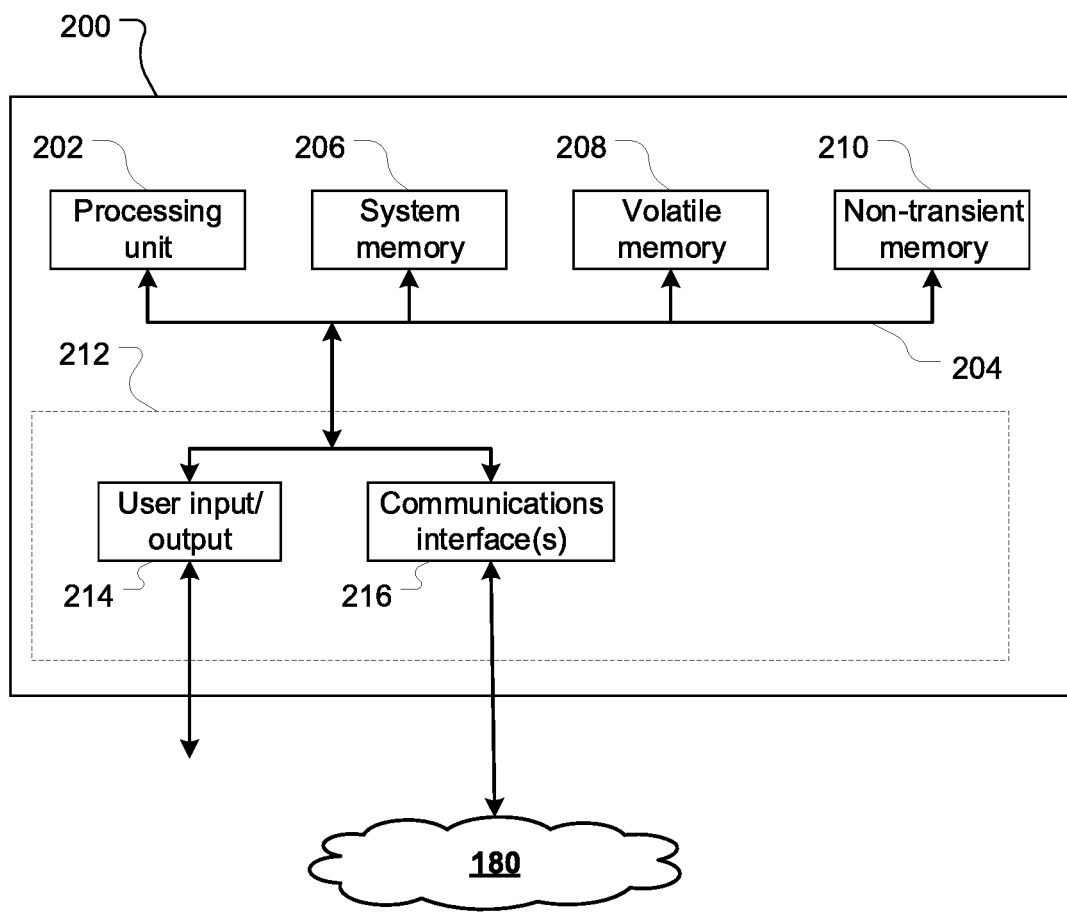
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BRSS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; SS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input or input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 180 of environment 100 (and/or a local network within the RS 102 or SS 120). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows®, Apple SSX, Apple RSS, Android, Unix, or Linux.

System 200 also stores or has access to applications which, when executed by the processing unit 202, configure system 200 to perform various computer-implemented processing operations described herein. For example, and referring to the networked environment of FIG. 100 above: client system 140 includes an RS client 142 and client system 160 includes an SS client 162, the clients configuring the client system 140 and 160 to perform the operations described herein.

In some cases part or all of a given computer-implemented method will be performed by system 200 itself, while in other cases processing may be performed by other devices in data communication with system 200.

4. Creating an Integration Between Two Systems

This section describes operations performed to create an integration between two systems—e.g. a receiving system 102 and a sending system 120.

Creating an integration between the two systems requires a user to logon/access the RS server application 104 using an RS client 142 and RS user account. Integration creation also requires a user (the same user who has accessed the RS 102 or a different user) to login/access the SS server application 124, using an SS client 162 and SS user account.

In the implementations described herein, RS 102 and SS 120 are configured so that only user accounts with appropriate permissions are able to perform integration creation and integration management operations—for example admin user accounts with administrative permissions.

In many cases the same single user may have access to appropriately permissioned RS and SS admin user accounts, and as noted above both the RS and SS clients 142 and 162 may in fact be installed on a single computer system or device.

General Integrations User Account

In the implementations described herein the RS 102 creation and use of what will be referred to as a general integrations user account.

In these implementations, a given tenant for which RS 102 provides services has at most one general integrations user account associated therewith—the general integrations user account effectively being a proxy account for all integrations created by user accounts associated with that tenant (e.g. via a tenant ID).

For example, a given tenant that RS 102 provides services for may have multiple administrator user accounts, multiple 'normal' user accounts, and a single general integrations user account. Any appropriately permissioned user accounts associated with the tenant (e.g. admin user accounts) can be used to create one or more integrations with one or more sending systems. As discussed below, each of the tenant's integrations is created and managed using that tenant's single general integrations user account.

As also discussed below, general integrations user accounts are created without any permissions and the password for the account is not stored anywhere.

Creation and use of a general integrations user account as described provides a number of benefits.

To illustrate one benefit, consider an implementation in which instead of creating integrations using a general integrations user account for a tenant, a given integration is created using the specific user account requesting creation of the integration. If the owner of that user account left the tenant, the user account would then be deleted or become unusable, and it would no longer be possible to audit or manage the integration(s) created using that user account (e.g. to audit the integration, deactivate/delete the integration, change the APIs accessible to the integration, change the sending system resource locator for the integration, and/or perform other management operations for the integration). By using a general integrations user account, however, any user account of the tenant with appropriate permissions (e.g. admin user accounts) can be used to audit/manage all integrations created for that tenant, regardless of the specific user account under which creation of the integration as initially requested.

To illustrate a further benefit, consider a tenant which has multiple user accounts with permissions to create integrations at the RS 102 (e.g. multiple administrative user accounts). In this case, if no general integrations user account was created/used, a given user of the tenant would not (via their use account) be able to query the RS 102 to identify or manage all integrations created for that tenant. Instead, the particular user could only identify and access integrations created with that user's account. Once again, where a general integrations user account is created and used, any appropriately permissioned user account for a tenant can access all integrations created for the tenant.

Furthermore, because of the way the general integrations user account is created strong protection from malicious access is not required. Because the password of the general integrations user account is not stored, the only way for a malicious attacker (e.g. a hacker) to access the username/password of the general integrations user account is via network snooping. Even if a hacker was able to access the username/password of the general integrations user account, though, the general integrations user account has no permissions so cannot be used to access sensitive data or perform sensitive operations. Once again, this can be contrasted to an implementation in which integrations are created using actual user accounts of the tenant (which, as noted, will typically be an admin account). In this case, if a hacker successfully obtained details of the user account used to create an integration they would obtain details of an actual user account (and in all likelihood an admin user account).

Still further benefits that arise, at least in part, due to use of general integrations user accounts are described below in the section dealing with the management of integrations.

New Integration Creation

Figure 3:
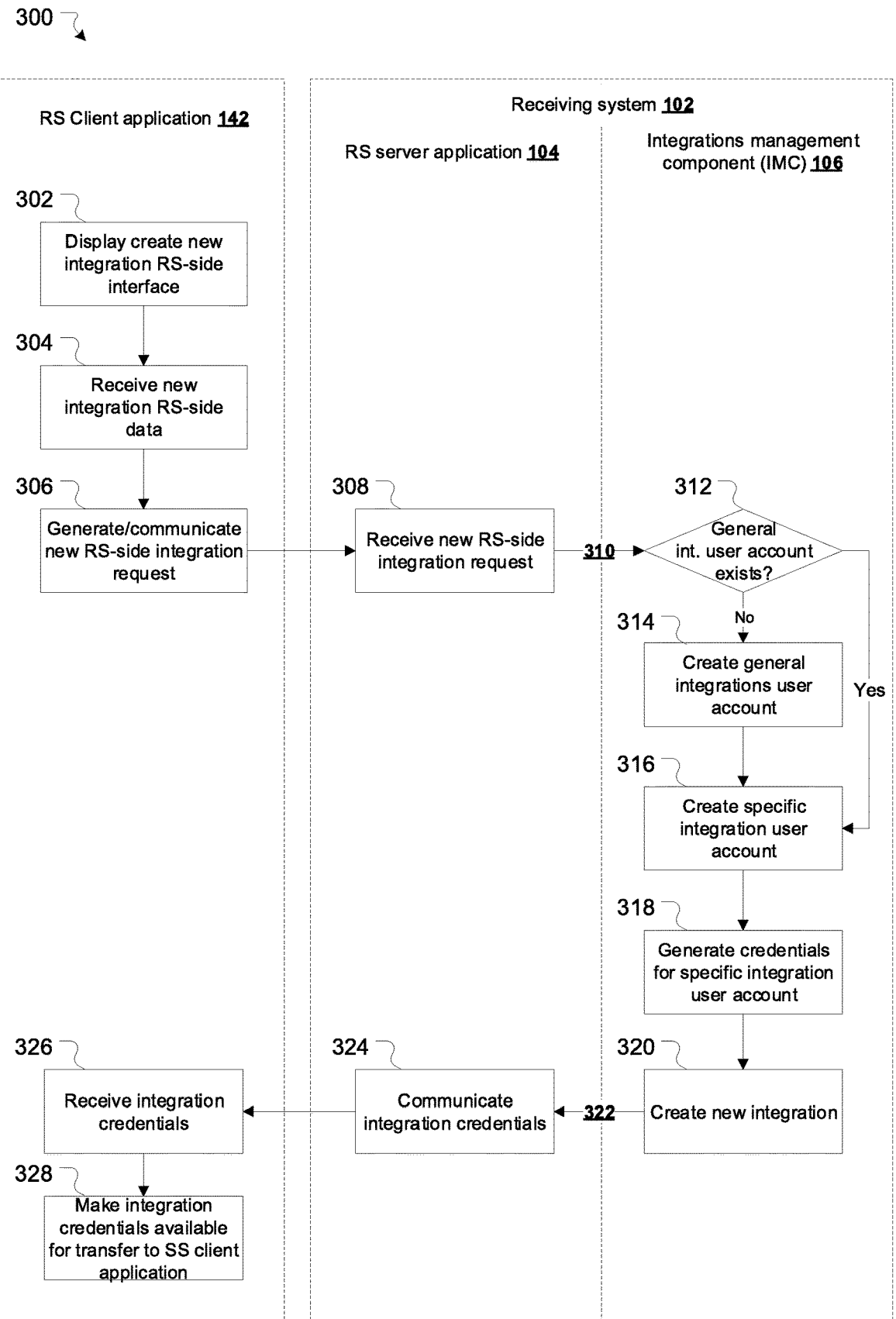
FIGS. 3 and 4 provide a flowchart depicting operations involved in creating a new integration between two systems.
Figure 4:
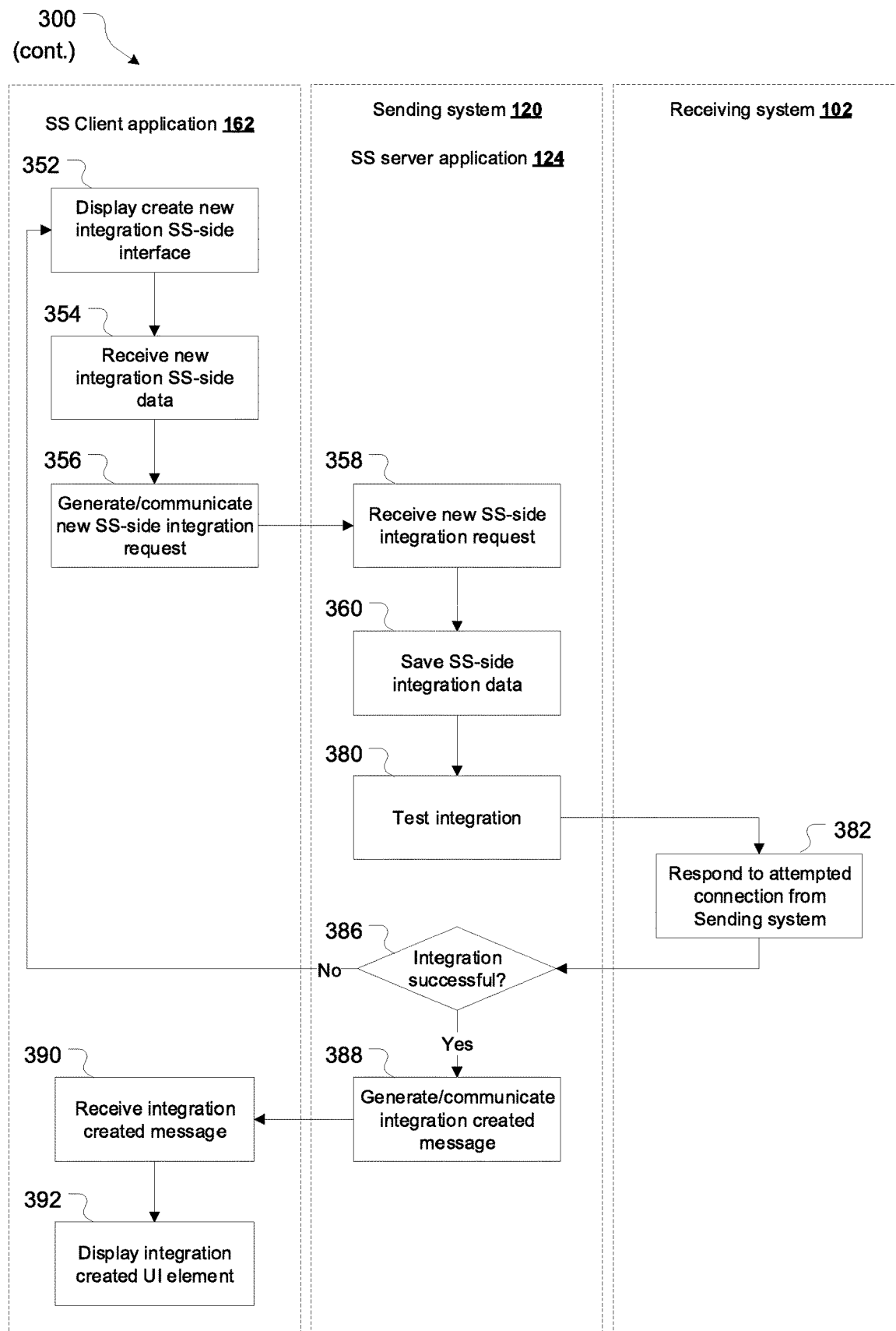

Turning to FIGS. 3 and 4, an example receiving system RS integration creation process 300 will now be described. Process 300 is described in two parts: receiving system operations (including operations performed by RS 102 and RS client 142) described with reference to FIG. 3, and sending system operations (including operations performed by SS 120 and SS client 162) described with reference to FIG. 4.

A number of operations and features described in the following two sections (the 'New integration creation: receiving system operations' and 'New integration creation: sending system operations' sections) have the same names. As an example, both of these sections describe a 'create new integration user interface' and 'new integration data'. These features can be more fully described using an SS-side or RS-side descriptor—e.g. a 'create new integration SS-side user interface', a 'create new integration RS-side user interface', 'new integration SS-side data', and 'new integration RS-side data'.

For readability, however, the 'SS-side' and 'RS-side' descriptors have not, for the most part, been used in these two sections.

Unless otherwise stated, references to operations and features in the 'New integration creation: receiving system operations' section should be considered to be references to RS-side operations and features.

Similarly, unless otherwise stated, references to operations and features in the 'New integration creation: sending system operations' section should be considered to be references to SS-side operations and features.

Elsewhere in the description and claims, the SS- and RS-side descriptors will be used where needed to avoid ambiguity.

New Integration Creation: Receiving System Operations

At 302, RS client 142 displays a create new integration user interface (UI) on client system 140 (i.e. a create new integration RS-side UI).

The RS client 142 may be configured to display the create new integration UI on detecting activation of a create new integration UI control. The new integration UI allows new integration data to be provided (i.e. new integration RS-side data) for a new integration that is to be created between the RS 102 and a particular SS 120.

The create new integration UI provides various UI elements (in a single view/page or multiple views/pages) for receiving new integration data—e.g. by prompting entry of relevant data and/or otherwise allowing a user to enter/select relevant details using one or more appropriate UI elements (e.g. data entry fields and/or data selection interfaces).

In the present embodiment, the new integration data includes an integration name (i.e. an RS-side integration name), a sending system resource locator, and one or more data type identifiers.

Any integration name may be defined. As an example, the integration name may be a name of the SS 120 for which the integration is being created and or a type of data the integration is created for—e.g. "Build and deployment data" or "Build data" or "Deployment data".

The sending system resource locator is a resource locator (e.g. a URL) for an appropriate endpoint of the SS 120. This resource locator can be used by the receiving system 102 in downstream operations based on data received from the sending system 120. For example, an integration may allow a build system (the sending system 120) to communicate build data to an issue tracking system (the receiving system 102). A user of the issue tracking system may then view an issue that the build data is associated with. The issue tracking system can then incorporate both the received build data and the build system URL into the issue view—e.g. by displaying a build summary (with data based on the received build data) as well as a hyperlink/control that, when activated, redirects to the build system so the user can view additional build information/perform build system operations.

The data type identifier(s) define the type(s) of data that can be communicated and managed using the integration. The data type identifier(s) determine the set of one or more receiving system APIs that, on creation of the integration, can be accessed by the SS 120. The integration data type identifier(s) may be provided in various ways.

For example, the RS client 142 may display a data type search and/or selection interface in which available data types are displayed for selection—for example 'Build data', 'Deployment data', 'Feature flag data', 'x type data', 'y type data', etc. Selection of a given data type then provides access to the APIs associated with that data type. For example, the 'build data' type may provide access to APIs which allow: the communication/submission of build data, the deletion of build data that has previously been provided to the RS by the SS, the retrieval of build data that has previously been provided to the RS by the SS.

Additional new integration data may also be allowed for. For example an integration graphic (such as a logo) may also be provided/received. In this case, the graphic can be used by the RS 102 in downstream operations that involve displaying data received using that integration.

At 304, RS client 142 receives the new integration data. The new integration data may be received via a user interface as described above (re 302). The new integration data may be alternatively provided, however, for example via a command line interface, uploading/transmittal of a new integration configuration file containing the new integration data, or by other means.

At 306, the RS client 142 generates a new integration request (i.e. a new RS-side integration request) which includes the new integration data and communicates this to the RS server application 104.

At 308, the RS server application 104 receives the new integration request. The integration request is associated with a user identifier (the identifier of the specific receiving system user account used to make the request), and the user identifier is in turn associated with a tenant identifier (i.e. the tenant that the user ID belongs to).

At 310, the RS server application 104 passes the new integration request (or data therefrom) to the IMC 106.

At 312, the IMC 106 determines if a general integrations user account exists for the tenant that the user identifier is associated with. The IMC 106 determines if a general integrations user account exists for the tenant in question by generating and submitting an appropriate query to the user directory component 108—e.g. a query using the tenant identifier associated with the user account. If a general integrations user account does not exist for the tenant, processing proceeds to 314. If a general integrations user account does exist for the tenant, an identifier of that general integrations user account is returned to the IMC 106 and processing proceeds to 316.

At 314, a general integrations user account does not exist for the tenant in question. In this case the IMC 106 creates, with the user directory component 108, a general integrations user account for the tenant (and associated with that tenant). In certain embodiments, the general integrations user account created for the tenant is a system user account without any permissions. Furthermore, on creation of the general integrations user account the IMC 106 discards the account password: i.e. the password is not communicated to any other system and is not stored by the RS 102 itself.

Creating a general integrations user account results in details of the general integrations user account being stored in the user directory component 108 and a general integrations user account identifier being returned to the IMC 106. Once the general integrations user account has been created, processing continues to 316.

At 316, the IMC 106 uses the general integrations user account to create (via the user directory component 108) a further user account: a specific integration user account for the integration. The specific integration user account is, ultimately, the account that is used by the SS 120 to access the access the set of APIs matching the integrations data type(s) for the particular integration being created. Details of the specific integration user account are stored in the user directory component 108.

At 318, if not performed as part of creating the specific integration user account, the IMC 106 creates (or causes the creation of) credentials for the specific integration user account. The credentials for the specific integration user account become—and will be referred to as—integration credentials. As described below, the integration credentials are used by the SS server application 124 to access the RS 102 (specifically the RS API proxy 110).

In the present embodiment, the OAuth authorization protocol is used. In this case, the integration credentials include a client identifier (namely the identifier of the integrations-specific user account) and an associated secret. Further, the integration credentials are created with a specific set of scopes that allow the credentials to be used to access the public API data 114. Notably, in the present embodiments the OAuth scope does not specify any specific APIs that the specific integration user account can or cannot access: rather, the scopes simply provide general access to the APIs provided by the public API data 114.

At 320, the IMC 106 creates the new integration. The new integration can be created in various ways. Generally speaking, however, creation of the integration includes recording relevant data based on the data in the new integration request—e.g.: the integration name, the sending system resource locator, the integration data type identifier(s) (defining the set of RS APIs the integration provides access to), the integration graphic (if allowed for and provided), and the user identifier of the specific integration user account created for the integration. The new integration record may further include data (or associated metadata) such as the creation date of the new integration. The data in respect of the new integration can be stored by the IMC 106 in the RS data store 112 or in an alternative data store accessible to the IMC 106.

In the present embodiments, and in order to maintain versatility (e.g. the ability for a given integration to be installed by multiple tenants), creating the new integration involves writing data to several database tables. By way of specific example, in one implementation the RS 102 has a relational database (shown in FIG. 10) that includes an owners table 1002, an installations table 1004, a specific installation table 1006, and an integrations table 1010.

In the present example, the owners table 1002 is used to create records which associate a given tenant identifier with a general integrations user ID for that tenant. This table can be queried at 312 above to determine if a general integrations user account exists for a particular tenant, and when a new general integrations user account is created (at 314), a new owners record can be created to associated the identifier of that account with the relevant tenant ID.

In the present example, the installations table 1004 is used to create records that associate a particular integration installation with a given general integrations user ID. To do so an installation identifier is created, and (in this particular example) associated with a (tenant ID, general integrations user ID) tuple.

In the present example, the specific installation table 1006 is used to create records that provide details in respect of a specific integration installation. To do so an integration identifier is created, and (in this particular example) associated with a (tenant ID, general integrations user ID, installation ID) tuple. The specific installation table 1006 stores additional data for the specific installation, in this case the integration name, sending system resource locator, integration data type(s), and integration graphic. (One or more of these may be keys that link to additional database tables.)

In the present example, the integrations table 1010 is used to create records that include the specific integration user ID for a given integration. In this particular example, the specific integration user ID is identified by a (tenant ID, general integrations user ID, installation ID, and integration ID) tuple.

In this example, therefore, creation of the new integration at 320 involves: creating a new installations record (per table 1004) that associates the tenant ID and general integrations user ID with a new installation ID (the new installation ID generated by the RS 102); creating a new specific installation record (per table 1004) that associates the tenant ID, general integrations user ID, and installation ID with a new integration ID (the new integration ID generated by the RS 102) and other integration data; and creating a new integration record (per table 1010) that associates the tenant ID, general integrations user ID, installation ID, and integration ID with the specific integration user ID (generated at 316).

As noted, the particular tables of FIG. 10 have been provided as an example designed to be versatile. Alternative relational database schemas for creating an integration/storing integration data are possible, including schemas that include fewer or additional tables (and/or table fields).

At 322, the IMC 106 passes the integration credentials (i.e. the credentials of the specific integration user account) to the RS server application 104.

At 324, the RS server application 104 communicates the integration credentials to the RS client 142.

At 326, the RS client 142 receives the integration credentials.

At 328, the RS client 142 makes the integration's credentials available for transfer to the SS120. For example, the RS client 142 makes the credentials available for transfer to the SS client 162 and/or transfers the credentials to the SS client 162 (the SS client 162 then providing the credentials to the SS120. Transfer of the integration's credentials to SS client (and making it available for transfer) may be performed in various ways.

For example, the RS client 142 may generate a copy credentials user interface control which, when activated, copies the integration credentials to a temporary memory (e.g. a clipboard or the like). Where the RS client 142 and SS client 162 are installed on the same system, this allows the copied credentials to then be provided to the SS client 162 by a paste type operation (e.g. activating a paste credentials user interface control generated by the SS client 162).

Alternatively, where the RS client 142 and SS client 162 are installed on different systems (e.g. systems 140 and 160), the integration credentials can be copied to a file. That file can then be saved to a memory that is (or is made) accessible to the SS client 162, and/or communicated by an electronic message using a messaging system that is accessible on both systems: e.g. an email application, instant messaging application, or an alternative messaging system.

Transfer of the integration credentials from the RS client 142 to the SS client 162 is indicated by broken line 190, indicating that this communication may—though need not—be via network 180.

New Integration Creation: Sending System Operations

Tuning to FIG. 4, operations performed by the SS 120 and SS client 162 to create a new integration will be described.

Where integration component 126 is an add-on or plugin, the sending system operations presume that add-on/plugin has been installed at the SS 120 (in order to extend the native functionality of SS server application 124). In this case, installation of the add-on/plugin can be performed by use of a plugin manager or the like provided by the SS server application 124.

At 350, SS client 162 displays a create new integration UI on client system 160 (i.e. a create new integration SS-side UI).

The SS client 162 may be configured to display the create new integration UI on detecting activation of a create new integration UI control. The new integration UI allows new integration SS-side data to be provided for a new integration that is to be created between the SS 120 and a particular RS 102.

The new integration UI provides various UI elements (in a single view/page or multiple views/pages) for receiving new integration data—e.g. by prompting entry of relevant data, allowing data (such as the integration credentials) to be pasted from a clipboard or accessed from a file, and/or otherwise allowing a user to enter/select relevant details.

In the present embodiment, the new integration data includes an integration description (i.e. an SS-side integration description), a receiving system resource locator, and integration credentials.

Any integration description may be used. As an example, the integration description may be a name of the RS 102 for which the integration is being created and/or the reason the integration is created for—e.g. "Issue tracking system integration", "Build data to issue tracking system", or any other description.

The receiving system resource locator is a resource locator (e.g. a URL) of an appropriate endpoint of the receiving system 102: e.g. a URL of the API proxy 110 of the tenant's receiving system cloud site that is hosted by the RS 102. This resource locator is used by the sending system 120 in downstream operations to make use of the receiving system APIs the integration provides the sending system 120 with access to.

The integration credentials are the credentials generated by the RS 102 (e.g. at 318 above) and made available by the RS client 142/transferred from the RS client 142 to the SS client 162. As described at 328 above, the integration credentials may be transferred to the SS client 162 (and entered in the new integration SS-side interface) in various ways.

Additional new integration data may also be allowed for.

At 354, the SS client 162 receives the new integration data. The new integration data may be received via a user interface as described above (re 352). The new integration data may be alternatively provided, however, for example via a command line interface, uploading/transmittal of a new integration configuration file containing the new integration data, or by other means.

At 356, the SS client 162 generates a new integration request (i.e. a new SS-side integration request) which includes the new integration data and communicates this to the SS server application 124.

At 358, the SS server application 124 receives the new integration request. The integration request is associated with a user identifier (the identifier of the specific sending system user account used to make the request).

At 360, the SS server application 124 stores the new integration data from (or based on) the new integration request for downstream use—for example in an SS 120 data store (not shown). In certain embodiments, storage (and downstream use of) the integration data is functionality provided by integration component 126.

At the completion of 360 the integration has been created. In certain implementations, following 360 processing proceeds directly to 388 to confirm creation of the integration (despite the fact that the integration may not have been successfully created, which will be discovered on any downstream attempt to communicate data to the RS 102 using the integration).

In other implementations, however, following 360 processing continues to 380 to test the integration.

For convenience, testing the integration in process 300 has been illustrated as two processing blocks: 380 performed by the SS server application 124, and 382 performed by the receiving system 102. The SS server application 124 can test the integration at 380 in various ways, however, most of which will involve additional processing at both the SS 120 and RS 102.

For example, testing the integration may involve attempting to connect to the RS 102 in a similar or the same way as described at operations 502 to 512 of process 500 described below. In this case testing the integration only involves testing that the SS server application 124 can access the RS API proxy 110 using the receiving system resource locator and integration credentials.

Alternatively, testing may involve attempting to connect to the RS 102 and communicate dummy or test data using an RS API the integration is supposed to provide access to—e.g. in the same or a similar way as described at operations 502 to 562 of process 500 described below. In this case testing the integration involves testing both that the SS server application 124 can access the RS API proxy 110 (using the receiving system resource locator and integration credentials) and that the SS server application 124 has access to at least one API that the integration is intended to provide access to.

As a further example, testing may involve attempting to connect to the RS 102 (per operations 502 to 512 of process 500) and, if the connection is successful at 512, generating and communicating an accessible API call (itself using an API) to the RS 102. The RS 102 then responds to this call with a listing of any APIs the integration provides access to (e.g. by the RS API proxy passing the request to the RS data store 112, which checks the data types associated with the integration record for the integration and generates a response based thereon).

At 386, the SS server application 124 determines, based on any data received back from the RS 102, whether creation of the integration was successful.

If a defined time-out period is reached before the SS server application 124 receives a response from the RS 102 (optionally with a defined number of retries), the SS server application 124 determines at 386 that creation of the integration was not successful. In this case, the SS server application 124 generates and communicates an integration failed communication to the SS client application 162 indicating that creation of the integration has failed and, optionally, suggesting that the receiving system resource locator may have been incorrectly entered.

If a response is received from the SS server application 124 indicating that the credentials are invalid, the SS server application 124 again determines at 386 that creation of the integration was not successful. In this case, the SS server application 124 generates and communicates an integration failed communication to the SS client application 162 indicating that creation of the integration has failed and, optionally, indicates that invalid credentials have been provided.

If a response is received from the SS server application 124 indicating that the integration does not provide access to the RS API the SS server application 124 attempted to call (or any RS API), the SS server application 124 again determines at 386 that creation of the integration was not successful. In this case, the SS server application 124 generates and communicates an integration failed communication to the SS client application 162 indicating that creation of the integration has failed and, optionally, indicates that the integration does not have permissions to access a particular (or any) RS API.

In these integration creation unsuccessful cases, the SS client application 162 may return to the create new integration interface (or a similar interface) to allow the new integration data to be amended/re-entered.

If a response is received (within any timeout period defined) from the SS server application 124 indicating that the credentials are valid (and one or more RS APIs can be used, if this is tested), the SS server application 124 determines at 386 that creation of the integration was successful. In this case, processing proceeds to 388.

At 388, the SS server application 124 generates and communicates an integration created successfully message to the SS client application 162. If testing involves checking the RS APIs the integration provides access to, the SS server application 124 can confirm the APIs it has access to are as intended for the integration.

At 390, the SS client application 162 receives the integration created successfully message from the SS server application 124.

At 392, the SS client application displays an integration successfully created UI element—for example a text box, information pane, graphic, or other UI element indicating the integration has been successfully created.

Integration Creation—Example Embodiments

Further non-limiting examples of specific feature combinations taught within the present disclosure are set out in the following example embodiments.

One example embodiment is directed to a computer implemented method for configuring a receiving system to receive data from a sending system, the method includes receiving, at the receiving system, an integration creation request from a client application, the integration creation request being made via a receiving system user account and being a request to create an integration between the receiving system and the sending system. The method also includes creating, by the receiving system, a specific integration user account, the specific integration user account including specific integration user account credentials which provide access to the receiving system. The method also includes communicating, by the receiving system, the specific integration user account credentials to the client application. The method also includes creating, by the receiving system, an integration record comprising details in respect of the integration being created, the integration record being associated with the specific integration user account. The integration record may be stored at the receiving system.

In some cases, creating the specific integration user account the method further comprises: determining, by the receiving system, a tenant associated with the receiving system user account; accessing a general integrations user account associated with the tenant; and creating the specific integration user account using the general integrations user account.

In some cases, accessing the general integrations user account associated with the tenant comprises: determining whether a general integrations user account associated with the tenant exists, and in response to determining that a general integrations user account associated with the tenant does not exist, creating a new general integrations user account for the tenant. In some implementations, on creating the new general integrations user account for the tenant, a password for the general integrations user account is discarded.

In some embodiments, the specific integration user account is associated with one or more data types, each data type defining a type of data that the sending system will be able to send to the receiving system and providing access to one or more specific APIs provided by the receiving system for sending the type of data. The one or more data types may be associated with the integration record.

In some cases, the one or more data types include a build data type. In some cases, the one or more data types include a deployment data type.

In some implementations, a user directory component of the receiving system is used to create and store details of the specific integration user account. Further, the integration record may be stored at a data store component of the receiving system that is separate to the user directory component.

In some cases, communicating the specific integration user account credentials to the client application causes the client application to make the specific integration user account credentials available to the sending system. In some cases the specific integration user account credentials are OAuth credentials having a set of scopes that provides access to a proxy API server of the receiving system.

Some example embodiments are directed to a computer processing system comprising: a processing unit; a communication interface; and a non-transient computer-readable storage medium storing sequences of instructions, which when executed by the processing unit, cause the processing unit to perform a computer implemented method according to one or more of the examples described above.

Some example embodiments are directed to a non-transient storage medium readable by a processor, the storage medium storing instructions executable by a processing unit to cause the processing unit to perform a computer implemented method according to or more of the examples described above.

5. Communicating Data Between Two Integrated Systems

Figure 5:
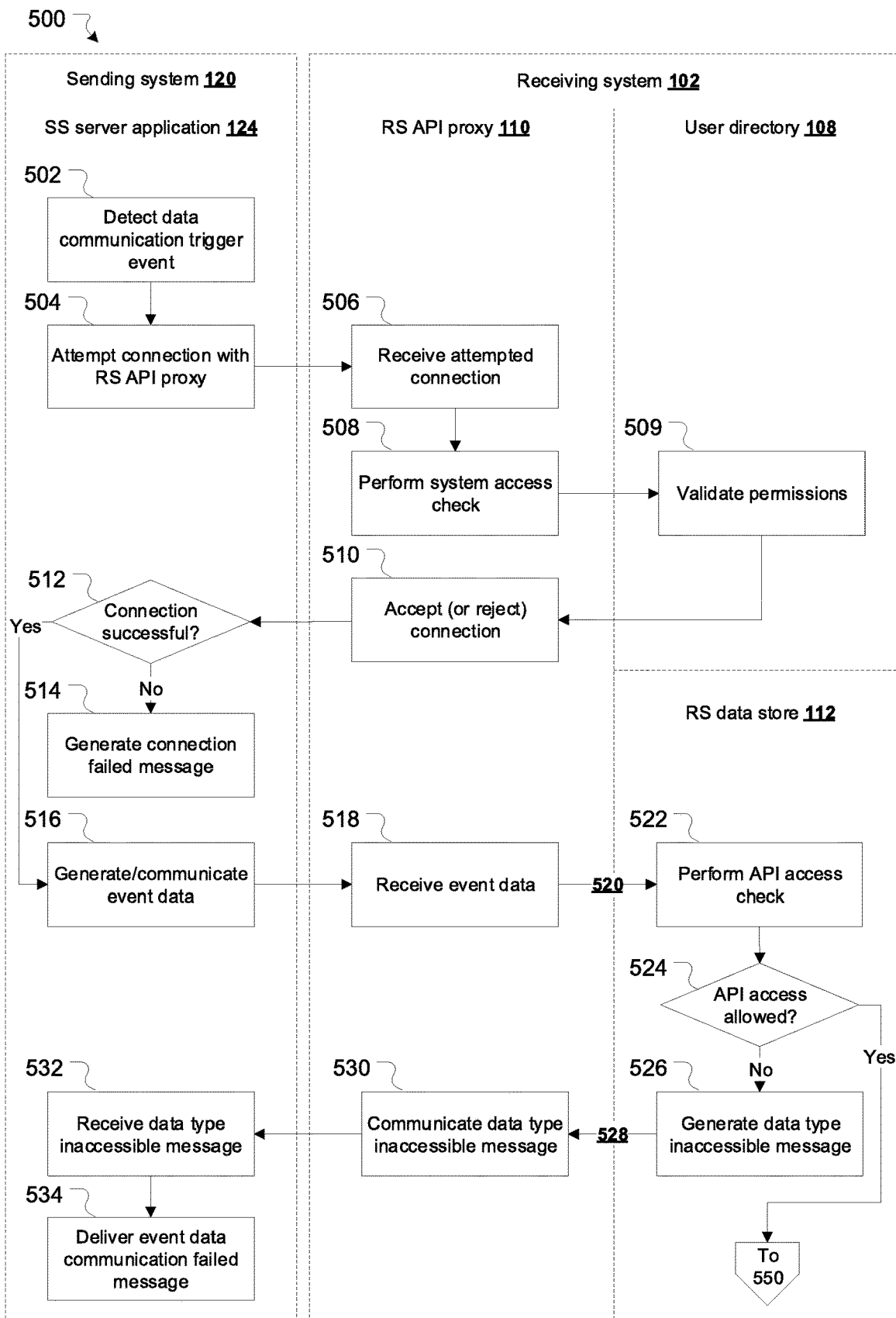
FIGS. 5 and 6 provide a flowchart depicting operations involved in using an integration between two systems to communicate data.
Figure 6:
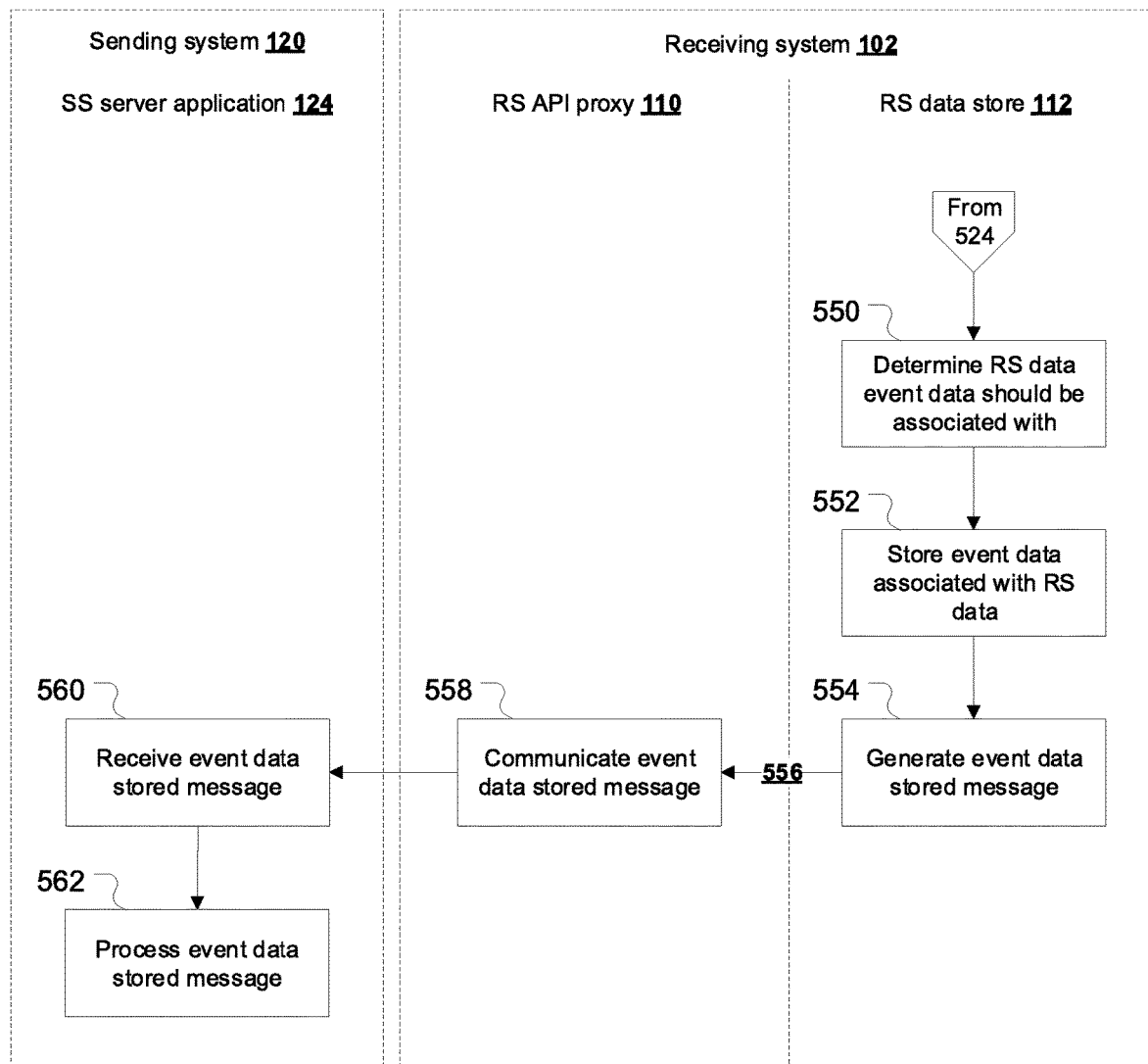

Turning to FIGS. 5 and 6, an example process 500 for communicating data from an SS 120 to an RS 102 (the SS 120 and RS 102 having being configured as described above) will be described.

At 502, the SS server application 124 detects occurrence of a data communication trigger event. In certain embodiments, the data communication trigger and detecting occurrence thereof is functionality provided by integration component 126.

The precise nature of the data communication trigger event will depend on various factors, such as: the type of the SS 120 (and, therefore, the operations the SS performs and data it generates); the type of the RS (and, therefore, the operations the RS performs and data from the SS 120 is relevant to the RS 102); the integration(s) between the SS 120 and RS 102 (the data type(s) of which define the RS APIs the SS 120 has access to).

In order to provide examples, however, consider again an integration between an issue tracking type RS 102 and a CI/CD type SS 120.

Where the integration allows for the communication of build data, the integration may define data communication triggers that include one or more build event triggers, for example: a build commencement trigger, which is triggered when the SS 120 detects commencement of a build that relates to one or more issues maintained by the RS 102; a build success trigger, which is triggered when the SS 120 detects successful completion of a build that relates to one or more issues maintained by the RS 102; a build failure trigger, which is triggered when the SS 120 detects an attempted build that relates to one or more issues maintained by the RS 102 has failed; and/or alternative triggers based on any other relevant build event.

As a further example, where the integration between the issue tracking RS 102 and CI/CD SS 120 allows for the communication of deployment data, the integration may define data communication triggers that include one or more deployment event triggers, for example: a deployment commencement trigger, which is triggered when the SS 120 detects commencement of a deployment that relates to one or more issues maintained by the RS 102 to a particular environment (e.g. a test environment, staging environment, production environment, or other environment); a deployment success trigger, which is triggered when the SS 120 detects successful completion of a deployment that relates to one or more issues maintained by the RS 102 to a particular environment; a deployment failure trigger, which is triggered when the SS 120 detects failure of an attempted deployment that relates to one or more issues maintained by the RS 102 to a particular environment; and/or alternative triggers based on any other relevant deployment event.

Additional types (and specific instances) of data communication trigger events are possible.

At 504, in response to detecting occurrence of a data communication trigger event, the SS server application 124 attempts to connect to the RS 102—and in particular the RS API proxy 110.

Initially this involves the SS server application 124 determining the particular integration that the data communication trigger event relates to. For example, if SS 120 has separate build data and deployment data integrations and a build event trigger is detected, the SS 120 will determine that the event relates to the build data integration (as this will be the integration that defines the trigger event in question). Once the particular integration has been determined, the SS 120 accesses the credentials stored for that integration and attempts connection with the RS 102 using those credentials.

As noted, in the present disclosure the OAuth authorisation protocol is used to access to the RS API proxy 110. In this case normal OAuth protocol is followed. For example, the SS server application 124 initially uses the credentials to request an OAuth access token. If the credentials are valid, the access token is returned to the SS server application 124. The SS server application 124 then uses the access token to communicate with RS API proxy 110.

At 506, the RS API proxy 110 receives the attempted connection from the SS server application 124.

At 508, the RS API proxy 110 performs a system access check. The system access check is performed to determine whether the connection requested by the SS server application 124 should be accepted or rejected and is based on the credentials being used to access the RS 102. In order to perform the system access check, the RS API proxy queries the user directory component 108 which (at 509) validates (or otherwise) the permissions associated with the SS server application's credentials to determine whether the SS server application 124 can connect to the API proxy 110.

At 510, if the system access check is successful, the RS API Proxy 110 communicates data back to the SS server application 124 indicating this. If not, the RS API proxy 110 may either communicate data indicating this back to the SS server application 124 or make no response to the SS server application 124.

At 512, the SS server application 124 determines whether the attempted connection was successful—based on either receipt of data indicating success/failure, or on not receiving a response within a defined timeout period (optionally with a defined number or retries).

If, at 512, the SS server application 124 determines the connection was not successful, processing continues to 514 where the SS server application 124 generates a connection failed message. This message may be delivered to an appropriate user of the SS 120 (e.g. an admin user) at some point to let them know that the integration has failed. It does not, however, otherwise interrupt the operations of the SS 120.

If, at 512, the SS server application 124 determines the connection succeeded, processing continues to 516 where the SS server application 124 generates an event message (if not already generated) and communicates this to the RS API proxy 110.

The format of the event message, and actual data provided, depends on the particular event that has occurred and the data/format required by the relevant RS API that will be used to communicate the event data to the RS 120. Example APIs are described below. Generally speaking, however, the event message will include sending system data that has been generated by the SS server application 124 and relates to the trigger event in question (e.g. data in respect of a build, data in respect of a deployment, other data).

In addition, the event message will also include a receiving system data identifier: i.e. an identifier of particular data that is maintained by the RS 120 and that the sending system data is intended to be associated with.

In order to illustrate this, consider again the example in which the RS 120 is an issue tracking system.

In this case, the receiving system data identifier may be an issue identifier: i.e. the identifier of a particular issue that is maintained by the RS 120.

Further, where the integration allows for the communication of build data, the SS server application 124 may be configured to determine that a build event relates to one or more particular issues maintained by the RS 102 (and, accordingly the issue identifiers of those issues) in various ways. For example, a given build event may be performed on source code managed by a source code repository system (for example Bitbucket or another source code repository system). In such cases, one or more issue identifiers can be referenced in relevant source code management system actions, events, or data fields. For example, one or more issue identifiers can be included in: a commit message; a source branch name; a pull request title; and/or any other relevant source code repository system action/event/data field. In turn, the CI/CD SS 120 performs a build on source code identified (for example) by a commit identifier. If the commit message (or other data) associated with the commit identifier includes one or more issue identifiers, the CI/CD SS 102 detects these, determines that the build event relates to one or more issues maintained by the issue tracking RS 102, and extracts the issue identifier(s) (i.e. the receiving system data identifiers) for inclusion in the build event message that is to be communicated to the issue tracking RS 102 (described further below).

Build events may be associated with one or more issue identifiers in other ways. For example, when configuring a build a user can manually associate the build with one or more issue identifiers.

As a further example, where the integration allows for the communication of deployment data, the SS server application 124 may be configured to determine that a deployment event relates to one or more issues maintained by the RS 102 in various ways. For example, the SS server application 124 may be configured to determine that a deployment event relates to one or more issues in a similar way to determines that a build event relates to one or more issues (as described above). For example, a given deployment performed by the CI/CD SS 120 system may be based on an artefact (e.g. a build) which, in turn, is generated based on source code. Per the above example, the source code can be identified by a particular commit identifier. If the commit message (or other data) associated with the commit identifier includes one or more issue identifiers, the CI/CD SS system 120 can identify the associated issue(s) from the commit message (or other data).

Deployment events may be associated with one or more issues in other ways. For example, when configuring a deployment a user can manually associate the deployment with one or more issue identifiers.

At 518, the RS API proxy 110 receives the event data.

At 520, the RS API proxy 110 passes the event data and the identifier of the user account being to connect to the RS API proxy 110 to the RS data store 112.

At 522, the RS data store 112 performs an API access check. The API access check is performed in order to ensure that the SS server application 124 has permission to access the specific API it is attempting to use to communicate the event data. In the present example, in order to perform the API access check, the RS data store 112 determines the API that the SS server application 124 is attempting to use (e.g. by reference to the API endpoint). The RS data store 112 also checks to see if an integration record that is associated with the user account used to connect to the RS API proxy 110 (and send the event data) exists and, if so, whether that integration record includes data type(s) that give access to the required API.

At 524, the RS data store 112 determines if the API access check was successful.

If, at 524, the RS data store 112 determines there is not an integration record giving the SS server application 124 access to the API the SS server application 124 is attempting to use, the RS data store 112 determines the second credential check to be unsuccessful and processing continues to 526. At 526, the RS data store 112 generates a data type inaccessible message to indicate that the SS server application 124 does not have permission to use the API(s) required to communicate the event data message. The data type inaccessible message may include further information, for example information on the integration that is missing/would be required to communicate the event data message in question.

At 528, the RS data store 112 passes the date type inaccessible message to the RS API proxy 110, and at 530 the RS API proxy communicates the data type inaccessible message (or a message including data based thereon) to the SS server application 124.

At 532, the SS server application 124 receives the data type inaccessible message from the RS API proxy 110.

At 532, the SS server application 124 delivers an event data communication failed message. This message may be delivered to an appropriate user of the SS 120 (e.g. an admin user) at some point to let them know that while the SS 120 can access the RS 102, the SS 120 does not have access to the specific APIs required to send the particular type of event data in question. Once again, delivery of the event data communication failed message to a user does not otherwise interrupt the operations of the SS 120.

If, at 524, the RS data store 112 determines there is an integration record giving the SS server application 124 access to the API the event data message is attempting to use, the SS server application determines the API access to be successful and processing continues to 550 (FIG. 6).

At 550, the RS data store 112 determines particular RS data that the received event data should be associated with. This determination will depend on the various systems being integrated and the type of data being communicated (and API being used).

Returning to the issue tracking RS 102 and CI/CD SS 120 example, determining the RS data that the extracted event data should be associated with involves determining one or more issues that the extracted event data should be associated with. These issues may be determined, for example, by issue identifiers included in the extracted event data.

At 552, the RS data store 112 stores the received event data as RS application data 116, and in a way that is associated with the existing RS data determined at 550. For example, where the RS 102 is an issue tracking system, the received event data is associated with one or more issues maintained by the issue tracking system.

In certain embodiment, the RS data store 112 records additional data relating to the event data stored at 552. For example, the RS data store 112 may record data such as the user account used to send the event data (i.e. the specific integration user account generated on creating the integration at 320), a date stamp recording the time the event data was received, a date stamp recording the time the event data was processed, and/or any other data associated with the API call communicating the event data. This additional data provides audit data in respect of the event data RS 102 has received from the SS 120.

At 554, the RS data store 112 generates an event data stored message and, at 556, passes this message to the RS API proxy.

At 558, the RS API proxy communicates the event data stored message (or a message with data based thereon) to the outgoing server application 124.

At 560, the outgoing server application 124 receives the event data stored message from the RS API proxy 110.

At 562, the outgoing server application 124 processes the event data stored message. The outgoing server application 124 can be configured to process the event data stored message in various ways, ranging from ignoring the message to logging the message (and data associated therewith) for audit trail purposes at the SS 120 (e.g. a record of what event data has been sent to the RS 102 and when).

Process 500 is then complete.

Process 500 as described above includes two separate access checks.

The first access check—the system access check at 508—is performed by the RS API proxy 110 and is based on the credentials received from the SS server application 124. This access check involves accessing the user directory component 108, and is a typical credential check performed at a server environment endpoint.

The second access check—the API access check at 522—is a runtime validation of whether the SS server application 124 can access the specific RS API it is attempting to use. This check is performed with reference to the integration record in question (stored, for example, in the RS data store 112) and therefore, advantageously, does not require the RS data store 112 to access the user directory component 108 (and any sensitive data, such as permissions data, stored therein).

By using two separate access checks, more useful data can be provided to the SS server application 124 in the even that an attempt to communicate data to the RS 102 fails. For example, if an attempt to communicate data fails, the present embodiments allow the SS server application 124 to be notified that its credentials are invalid, and therefore it cannot connect to the API proxy 112, or that its credentials are valid but it does not have access to one or more specific RS APIs it is attempting to use.

Furthermore, performing two access checks in the manner described effectively provides for a validation to be performed (i.e. whether access to the specific API is permitted) based on non-sensitive data. The system access check involves the user credentials and access to the user directory component. Given the system check determines whether an external system can access the RS 102, this check is security-critical and, therefore, will typically be managed by a dedicated security team. In contrast, the API access check can be considered a less security-critical check, and need not (though can if desired) be managed by the security team. Using two checks as described also simplifies the system access check (which can be a binary access allowed denied check), avoiding the need, for example to manage additional OAuth scopes.

Communicating Data Between Two Integrated Systems—Example Embodiments

Further non-limiting examples of specific feature combinations taught within the present disclosure are set out in the following example embodiments.

Some example embodiments are directed to a computer implemented method for sending data from a sending system to a receiving system. The method may include detecting, by the sending system, occurrence of a data communication trigger event. In response to detecting occurrence of the data communication trigger event, the method may include: determining a particular integration that the data communication trigger event relates to; accessing credentials associated with the particular integration; determining an event data communication format; generating an event message, the event message including sending system data, the sending system data being generated by the sending system, the event message being formatted according to the event data communication format associated with the particular integration; and attempting to communicate the event message to the receiving system using the credentials associated with the particular integration.

In some implementations, prior to attempting to communicate the event message to the receiving system the method further comprises: attempting to establish a connection with the receiving system using the credentials associated with the particular integration; determining if the attempt to establish the connection with the receiving system was successful; and in response to determining that the attempt to establish the connection with the receiving system was successful, attempting to communicate the event message to the receiving system.

In response to determining that the attempt to establish the connection with the receiving system was not successful, the method may further comprise: generating a connection failed message indicating that the credentials associated with the particular integration do not provide access to the receiving system; and foregoing attempting to communicate the event message to the receiving system.

In some cases, after attempting to communicate the event message to the receiving system the method further comprises: determining whether the attempt to communicate the event message to the receiving system was successful; and in response to determining that the attempt to communicate the event message to the receiving system was not successful, generating an event communication failed message indicating that the sending system does not have access to a particular API required to communicate the event message.

In some implementations, determining an event data communication format comprises determining a particular API that is associated with the particular integration and the data communication trigger event, the particular API defining the event data communication format.

In some implementations, generating an event message comprises: determining a receiving system data identifier that identifies particular data that is maintained by the receiving system and that the sending system data is intended to be associated with; and including the receiving system data identifier in the event message.

In some cases, the receiving system is an issue tracking system and the receiving system data identifier is an issue identifier that identifies an issue maintained by the receiving system. In some cases, the data communication trigger event relates to a software build. In some cases, the data communication trigger event relates to a software deployment.

Some example embodiments are directed to a computer implemented method for receiving data from a sending system at a receiving system. The method may include: receiving, at the receiving system, an event message from the sending system, the event message including sending system data; determining a particular API associated with the event message; determining whether the sending system is permitted to use the particular API; and in response to determining that the sending system is permitted to use the particular API. The event message may be processed by: determining particular receiving system data maintained by the receiving system that the event message relates to; storing the sending system data at a data store of the receiving system; and associating the stored sending system data with the particular receiving system data.

In response to determining that the sending system is not permitted to use the particular API, the method comprises foregoing processing the event message. In some cases, prior to receiving the event message from the sending system, the method further comprises: receiving, at the receiving system, an attempt by the sending system to establish a connection with the receiving system using credentials; determining, by the receiving system, if the credentials are valid. In response to determining that the credentials are not valid: refusing the connection with the sending system; and not receiving the event message. In some cases, the receiving system is an issue tracking system and the particular receiving system data is an issue maintained by the receiving system.

Some example embodiments are directed to a computer processing system comprising: a processing unit; a communication interface; and a non-transient computer-readable storage medium storing sequences of instructions, which when executed by the processing unit, cause the processing unit to perform a computer implemented method according to or more of the examples described above.

Some example embodiments are directed to a non-transient storage medium readable by a processor, the storage medium storing instructions executable by a processing unit to cause the processing unit to perform a computer implemented method according to or more of the examples described above.

6. Receiving System-Side Integration Management

Figure 7:
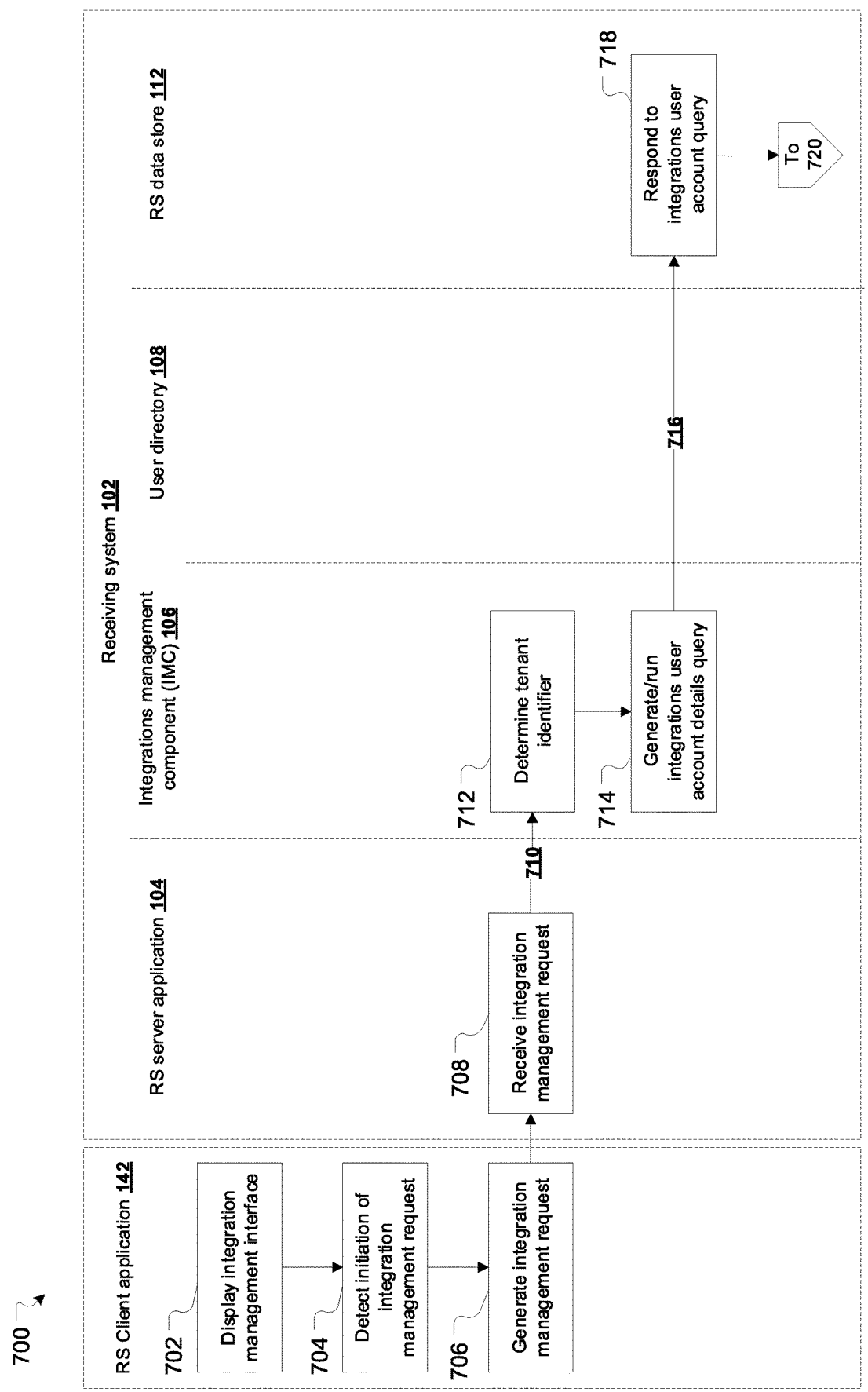
FIGS. 7 to 9 provide a flowchart depicting operations involved in managing one or more integrations.
Figure 8:
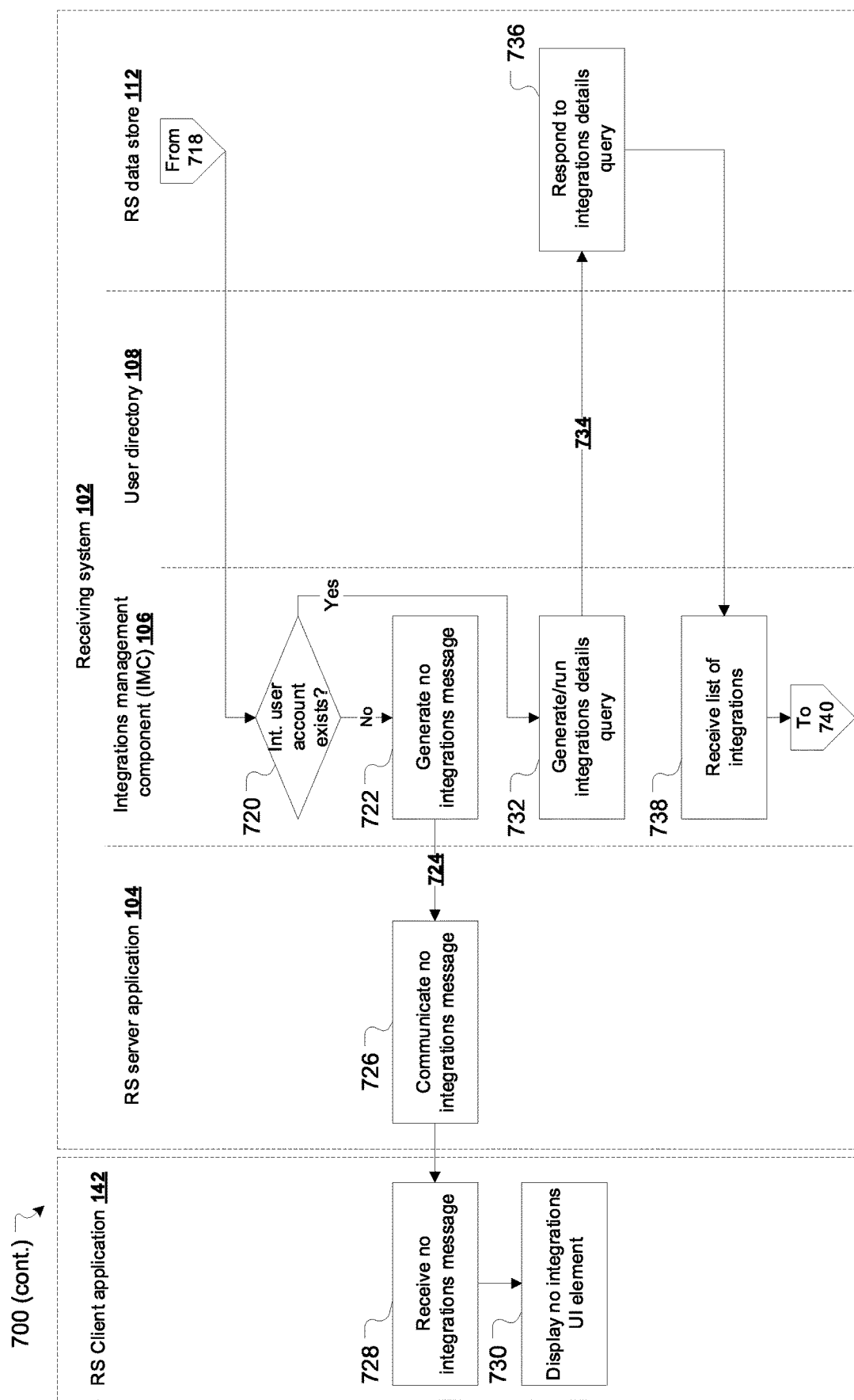
Figure 9:
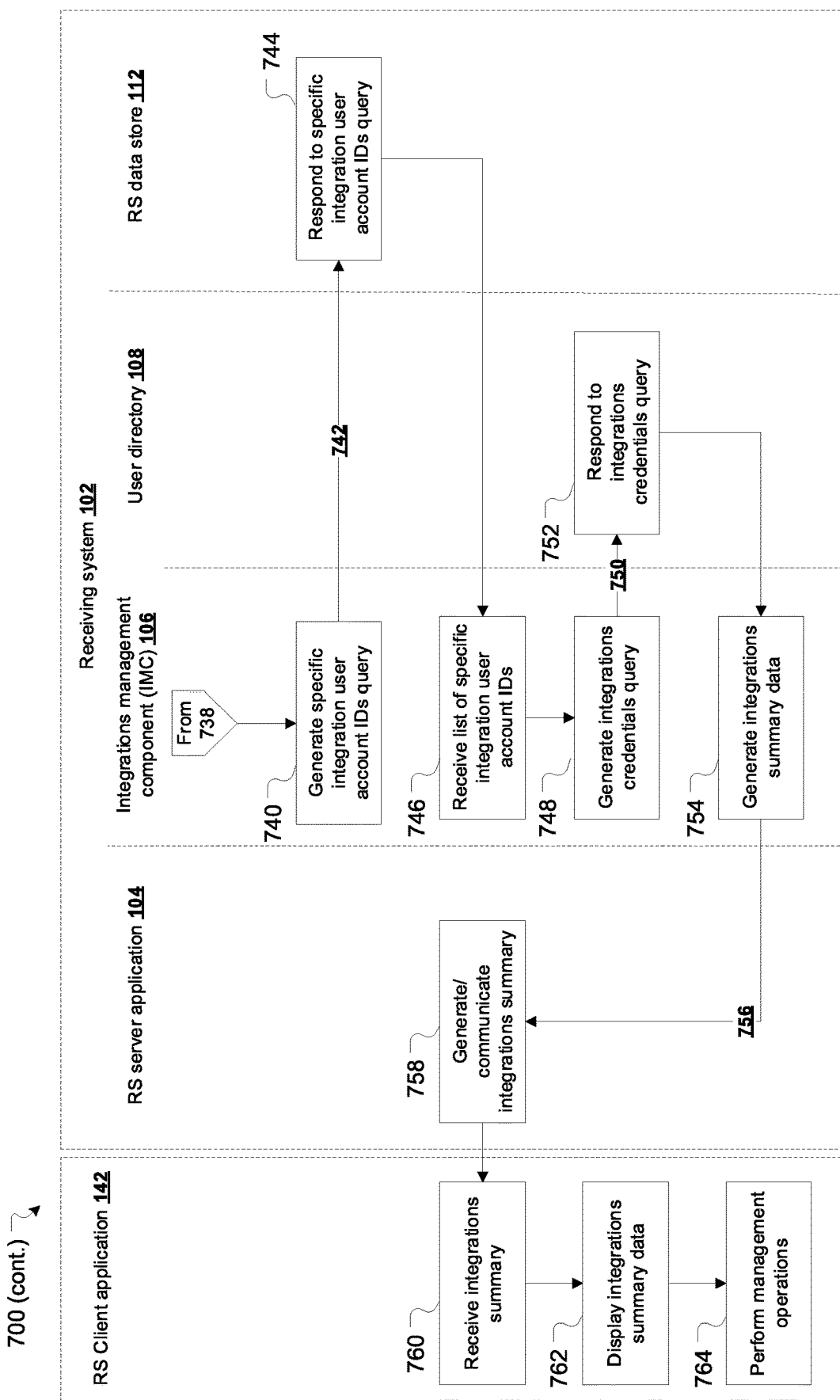

Turning to FIGS. 7-9, an example receiving system-side integration management process 700 will be described.

Process 700 can be performed by an appropriately permissioned RS user account to determine what (if any) integrations have been installed for a particular tenant's RS 102 instance and, if desired, to manage those integrations. Process 700 is performed via an appropriately permissioned user account of a given tenant (e.g. an admin account).

Process 700 assumes that integrations data is stored in database tables as shown in FIG. 10 and described above, and that the database tables are stored in RS data store 112. Where alternative tables/data structures are sued to store integration data, and/or the data is stored at a data store other than RS data store 112, process 700 can be modified.

At 702, RS client 142 displays a manage integrations UI control on client system 140. The manage integrations UI control may for example, be displayed in an administration view, menu, or any other user interface view/screen.

At 704, RS client 142 detects activation of the manage integrations UI control.

At 706, the RS client 142 generates an integration management request and communicates this to the RS server application 104.

At 708, the RS server application 104 receives the integration management request. The integration management request is associated with a user identifier (the identifier of the specific receiving system user account used to make the request).

At 710, the RS server application 104 communicates the integration management request to the IMC 106.

On receiving the integration management request, the IMC 106 initially determines if a general integrations user account exists for the tenant.

To do this, at 712 the IMC 106 determines the tenant identifier that is associated with the user account making the integration management request (i.e. the user account that has been used to log into the receiving system and initiate/submit the integration management request at 704/706).

At 714, the IMC 106 generates a general integrations user account details query to obtain the identifier of the general integrations user account associated with the tenant (if one exists). In the present example, the general integrations user account details query is a query of the owners table 1002 using the tenant identifier determined at 712.

At 716, the IMC 106 passes the general integrations user account details query to the RS data store 112.

At 718, the RS data store 112 receives the general integrations user account details query and responds. If a general integrations user account is associated with the tenant identifier included in the query, the RS data store 112 responds with the identifier of that general integrations user account. Otherwise, the RS data store 112 response indicates that no general integrations user account exists for the tenant.

At 720 (FIG. 8), the IMC 106 receives the response from the RS data store 112. If no general integrations user account identifier has been returned, processing proceeds to 722. If a general integrations user account identifier has been returned, processing proceeds to 732.

At 722, no general integrations user account exists for the tenant. In this case the IMC 106 generates a no integrations message and passes this to the RS server application at 724.

At 726, the RS server application 104 communicates the no integrations message (or a message based thereon) to the RS client application 142.

At 728, the RS client application 142 receives the no integrations message from the RS server application 104.

At 730, the RS client application displays a no integrations UI element—e.g. a text box, information pane, or other UI element indicating that no integrations have been installed for the tenant.

At 732, a general integrations user account is associated with the tenant and the IMC 106 has received the identifier of that account. In this case, the IMC 106 generates an integrations details query to obtain the integration and installation identifiers of any integrations that have been installed by users associated with the tenant. In the present example, the integrations details query is a query of the integrations table 1010 (and/or the specific installation table 1006) using the tenant identifier determined at 712 and the general integrations user account ID obtained at 720.

At 734, the IMC 106 passes the integrations details query to the RS data store 112.

At 736, the RS data store 112 receives the integrations details query and responds. Specifically, in the present example the RS data store 112 generates and returns a list of any integrations associated with the general integrations user account identifier and tenant identifier included in the query. For each integration in the list, the integration identifier and installation identifier are provided (e.g. by returning a list of (integration identifier, installation identifier) tuples).

At 738, the IMC 106 receives the list of integrations—e.g. a list of installation identifiers and integration identifiers for all integrations associated with the tenant.

At 740 (FIG. 9), the IMC 106 generates a (or several) specific integration user account identifiers query to obtain specific integration user account identifiers. In the present example, the specific integration user account identifiers query is a query of the integrations table 1010 using the tenant identifier determined at 712, the general integrations user account ID obtained at 720, and the installation and integration identifiers obtained at 738.

At 742, the IMC 106 queries the RS data store 112 component 108 using the specific integration user account identifiers query.

At 744, the RS data store 112 receives the specific integration user account identifiers query (or queries) and responds. For each integration, the RS data store 112 retrieves and returns the specific integration user identifier (e.g. from the integrations table 1010).

At 746, the IMC 106 receives the response to the specific integration user identifiers query (or queries). The response includes specific integration user account identifiers for each of the tenant's integrations.

At 748, the IMC 106 uses the specific integration user account identifiers generates an integration credentials query (or a series of integration credential queries) to retrieve credentials for each of the specific integration user account identifiers received at 746.

At 750, the IMC 106 queries the user directory component 108 using the integrations credentials query.

At 752, the user directory component 108 receives the integrations credentials query (or queries) and responds. For each integration, the user directory component 108 retrieves and returns the integration's credentials: e.g. for each integration the OAuth credentials for the specific integration user account initially created at 316.

At 754, the IMC 106 receives the response to the integrations credentials query from the user directory component 108 and generates integrations summary data. The integrations summary data can include, for example, a list of all integrations installed for the tenant along with some or all of the details for those integrations. For example, for each integration, the integrations summary data may include one or more of: the integration name; the sending system resource locator for the integration; the graphic associated with the integration; the data type identifier(s) for the integration; the API(s) that the data type identifier(s) relate (s) to; and the credentials for the integration. The IMC 106 passes the integrations summary data to the RS server application 104 at 756.

At 758, the RS server application 104 generates and communicates an integrations summary message to the RS client 142. The integrations summary message includes the integrations summary data.

At 760, the RS client 142 receives the integrations summary message.

At 762, the RS client 142 displays some or all of the integrations summary data in one or more user interfaces.

At 764, one or more integration management operations can be performed. Various integrations management operations are possible.

For example, a user of the RS client 142 may wish to re-perform SS-side integration setup (e.g. per the operations of FIG. 4 described above). In this case, the user can use the credentials of the relevant integration (available at the RS client 142 from the integrations summary received at 752) to do so as described above.

As a further example, a user of the RS client 142 may wish to delete an integration. In this case the user activates a 'delete integration' UI element displayed by the RS client 142, which causes appropriate data to be communicated to the RS in order to delete (or render defunct) the integration in question (e.g. by deleting the relevant integration record or otherwise flagging the record as being in respect of an integration that has been uninstalled).

As yet a further example, a user of the RS client 142 may wish to modify the attributes an integration: for example change its name, identifier, integration graphic, data types, and/or a sending system resource locator. In this case user interface elements for performing the desired changes are displayed by the RS client 142, with any changes (ultimately) being communicated back to the RS 102 and recorded in the relevant integration record for the integration.

Process 700 as described above provides a number of benefits.

For example, process 700 allows a single user of a given tenant to access (via their appropriately permissioned user account) information in respect of all integrations installed for that tenant. For example, if tenant 1 has four administrative user accounts (with user account identifiers A, B, C, and D), user account A can be used to determine all integrations for tenant 1, regardless of whether a given integration was created by user account A, B, C, or D. This benefit arises from providing a tenant with a single general integrations user account (created at 314 above) and using the tenant's general integrations user account to create all integrations for the tenant.

As another example, a user of a given tenant is (via their appropriately permissioned user account) able to query all integrations created for the tenant—and retrieve sensitive data (e.g. integration credentials) without having to submit any additional, sensitive credentials or identifiers. Per process 700, once the tenant identifier has been identified for an appropriately permissioned user account (at 712), it can be used to retrieve/access the general integrations user account identifier (another non-sensitive identifier, given the general integrations user account is a systems account created without any permissions), which is in turn used to retrieve/access integration identifier(s) and installation identifier(s) for any integrations. Together, the tenant identifier, general integrations user account identifier, installation identifier(s) and integration identifier(s) are used to retrieve the (sensitive) credentials for an integration.

As a further example, process 700 is such that the number of queries required to return sensitive integration data is reduced. Reducing the number of queries required to access/retrieve integration data reduces communications, processing, and improves the response time. This benefit arises by having a one-to-one relationship between an installation identifier and a corresponding integration identifier. Accordingly, process 700 involves: a first query to retrieve/access the general integrations user account identifier for the tenant (at 714, 716, and 718); a second query to retrieve/access both installation identifier(s) and integration identifier(s) of integrations installed for the tenant (at 732, 734, and 736); and a third query to retrieve/access credentials of the integration(s) (at 740, 742, 744).

This can be contrasted, for example, to alternative approaches in which the second query of process 700 would need to be performed in two separate queries: one query to retrieve/access the installation identifier(s) (using, for example, the tenant identifier and general integrations user account identifier); and a separate, second query to access the integration identifier(s) (using, for example, the tenant identifier, general integrations user account identifier, and installation identifier(s)).

Still further, in the described embodiments neither creation nor use of an integration requires the SS 120 to provide RS 102 (or any other external/third party system) access to any of its components (e.g. through firewall 128). The only incoming access needed for the SS 120 to create/use an integration is via SS client application 162 (which, of course, already has access in order to perform normal SS 120 operations).

Receiving System-Side Integration Management—Example Embodiments

Further non-limiting examples of specific feature combinations taught within the present disclosure are set out in the following example embodiments.

Some embodiments are directed to a computer implemented method. The method may include: receiving, at a receiving system, an integration management request from a client application; determining integration identifiers in respect of one or more integrations, each integration being associated with a sending system and providing a mechanism for the sending system to communicate data to the receiving system. For each integration identifier determined: retrieving a set of integration details; and returning the retrieved set of integration details to the client application.

In some implementations, the integration management request is made via a receiving system user account. The receiving system user account may be associated with a particular tenant that the receiving system provides software services for. Determining integration identifiers may include determining integration identifiers in respect of all integrations that that have been installed at the receiving system by all user accounts associated with the particular tenant.

In some implementations, determining integration identifiers comprises: determining a tenant identifier of the particular tenant; determining a general integrations user account associated with the tenant identifier; and determining integration identifiers of all integrations that that have been installed at the receiving system and that are associated with the general integrations user account.

In some cases, for a particular integration identifier that identifies a particular integration that is associated with a particular sending system, the set of integration details comprises specific integration user account details, the specific integration user account details being details in respect of a user account that can be used by the particular sending system to communicate data to the receiving system in accordance with the integration. In some cases, the specific integration user account is associated with the general integrations user account. In some cases, the specific integration user account details are retrieved from a user directory component of the receiving system.

In some implementations, determining the general integrations user account associated with the tenant identifier comprises querying a data store of the receiving system, the data store being separate to the user directory component.

In some cases, for a particular integration identifier that identifies a particular integration that is associated with a particular sending system, the set of integration details includes an identifier of the particular sending system.

In some cases, for a particular integration identifier that identifies a particular integration that is associated with a particular sending system, the set of integration details includes a resource locator of an endpoint of the sending system.

In some example embodiments, for a particular integration identifier that identifies a particular integration that is associated with a particular sending system, the set of integration details includes one or more data types. Each data type may identify: a particular type of data that the particular sending system can communicate to the receiving system using the particular integration; and one or more receiving system APIs that can be used by the particular sending system to communicate the particular type of data to the receiving system.

Some example embodiments are directed to a computer processing system comprising: a processing unit; a communication interface; and a non-transient computer-readable storage medium storing sequences of instructions, which when executed by the processing unit, cause the processing unit to perform a computer implemented method according to one or more of the example embodiments described above.

Some example embodiments are directed to a non-transient storage medium readable by a processor, the storage medium storing instructions executable by a processing unit to cause the processing unit to perform a computer implemented method according to one or more of the example embodiments described above.

7. Example Communication Between Outgoing and Receiving Systems

In the implementations described above, a given integration provides an SS 120 access to a defined set of APIs (the set of APIs defined according to the scope selected at the time of creating the integration or in a downstream modification thereof).

This section provides example of API calls that can be used where the RS 102 is an issue tracking system and the SS 120 is a build system (e.g. a CI/CD system or other build system).

The present examples include APIs by which an SS 120 can submit build data associated with one or more issue key(s) (the issue keys being maintained by the issue tracking RS 120), delete build data (that the SS 120 has previously provided to the issue tracking RS 102), and querying build data (that the SS 120 has previously provided to the issue tracking RS 102).

Additional and/or alternative APIs could be provided, and/or similar APIs could be provided with different schemas.

Submit Build Data

The table below provides a specific example of a submit build data API call (in cURL format):

```
curl --request PSST \
    --url '<receiving system URL>/rest/rest/builds/0.1/bulk'\
    --header 'Accept: application/json'\
    --header 'Content-Type: application/json'\
    --data '{
    "properties": {
        "accountId": "account-234",
        "projectId": "project-123"
    },
    "builds": [
        {
            "schemaVersion": "1.0"
            "pipelineId": "my-build-plan",
            "buildNumber": 16,
            "updateSequenceNumber": 1523494301448,
            "displayName": "My Project build #16",
            "description": "My Project build #16: Failed",
            "label": "<string>",
            "url": "<string>",
            "state": "failed",
            "lastUpdated": "2018-01-20T23:27:25+00:00",
            "issueKeys": [
                "RSSUE-123"
            ],
            "testInfo": {
                "totalNumber": 150,
                "numberPassed": 145,
                "numberFailed": 5,
                "numberSkipped": 0
            },
            "references": [
                {
                    "commit": {
                        "id": "08cd9c26b2b8d7cf6e6af6b49da8895d065c259f",
                        "repositoryUri": "https://<repository URI>"
                    },
                    "ref": {
                        "name": "feature/RSSUE-123-some-work",
                        "uri": "https://<ref URI>"
                    }
                }
            ]
        }
    ],
    "providerMetadata": {
        "product": "<e.g. name of sending system>"
    }
}
```

The following paragraphs describe the example submit build data call shown above. It will be appreciated that this is by way of specific example only. Alternative schemas capturing additional, reduced, or alternative build information/data (in the same or alternative ways) are possible.

The 'properties' object can be used to provide arbitrary properties that submitted builds are tagged with. These properties can be used, for example, in delete operations (described below) to clean up build information previously provided by the build SS 120.

The 'builds' array provides a list of builds and associated information that are submitted to the issue tracking RS 102. Each build may be associated with 1 or more issue tracking RS 102 issue identifiers/keys, and will also be associated with any properties included in the request.

Each element of the 'builds' array is an object providing data related to a single (distinct) build.

The 'schemaVersion' string in the example 'builds' array element is used to define the schema version used for the build update. Where no schema changes are anticipated (and there will only ever be one schema version) this string can be omitted.

The 'pipelineId' string in the example 'builds' array element provides a build sequence identifier which is used to relate a sequence of builds. This could, for example, be a project identifier, a pipeline identifier, a plan key, or any other identifier used to group a sequence of builds.

The 'buildNumber' integer in the example 'builds' array element is used to identify a particular build in the sequence of builds identified by the pipeplineId string. It can be used to identify the most recent build in the sequence of builds.

Together, the 'pipelineId' and 'buildNumber' provide build identify information to identify a build.

The 'updateSequenceId' integer in the example 'builds' array element provides an identifier that is used to apply an ordering to updates to the build in the case of out-of-order receipt of update requests. In an example implementation, epoch milliseconds from the build system (i.e. SS 120) are used for the updateSequenceId. Other alternatives are, however, possible (e.g. the SS 120 may maintain a counter against each build and increment that on each update to the RS 102). Updates for a build that are received with an updateSqeuenceId lower than what is currently stored will be ignored.

The 'displayName' string in the example 'builds' array element is used to provide a human-readable name for the build.

The 'description' string in the example 'builds' array element is optional and can be used to provide a description.

The 'label' string in the example 'builds' array element can be used to provide further (human-readable) information in respect of the build.

The 'url' string in the example 'builds' array element is used to provide a URL to the build in the build SS 120.

The 'state' string in the example 'builds' array element is used to provide the state of the build. This may, for example, be pending, in_progress, successful, failed, cancelled, unknown, and/or any other relevant build state.

The 'lastUpdated' string in the example 'builds' array element is used to provide a timestamp at which the state of the build was provided.

The 'issueKeys' array in the example 'builds' array element is used to provide one or more issue tracking RS 102 issue keys to associate the build information with. As discussed above, issue keys may be identified/extracted from data associated with the source code on which the build was performed (e.g. a commit message or the like).

The 'testInfo' object in the example 'builds' array element is used to provide optional information in respect of tests executed during the build.

In the 'testInfo' object, the 'totalNumber' integer is used to provide the total number of tests considered during the build.

In the 'testInfo' object, the 'numberPassed' integer is used to provide the number of tests that passed during the build.

In the 'testInfo' object, the 'numberFailed' integer is used to provide the total number of tests that failed during the build.

In the 'testInfo' object, the 'numberSkipped' integer is used to provide the total number of tests that were skipped during the build.

The 'references' array in the example 'builds' array element is optional and can be used to provide information that links a build to source code system information (e.g. a commit, a branch or other information). Each item of the references array is an object that includes a commit object and a ref object.

The commit object of the references array element provides details about the commit that the build was run against. The commit object includes an id string which provides the ID of the commit (for example, for a Git repository this would be the SHA1 hash), and a repositoryUri string used to identify the repository containing the commit (i.e. the source code on which the build was based). In most cases the repository Uri will be the URL of the repository in the source code management system provider. For cases where the build was executed against a local repository (for example) the repository URI is used to provide a unique identifier for the repository.

The ref object of the references array element provides details about the ref (for example branch, tag, etc.) the build was run on. The ref object includes a name string which is used to provide the name of the ref the build ran on and a uri string which identifies the ref (e.g. the URL of the tag/branch in question).

The providerMetadata object is optional, including a string that can be used to provide information about the build SS 120 that has submitted the build data.

Delete Builds by Key

The table below provides a specific example of a delete builds by key API call (in cURL format):
curl--request DELETE\
    --url 'https://<receiving system url>/rest/rest/builds/0.1/pipelines/{pipelineId}/builds/{buildNumber}'

This example delete builds by key API call requires a pipelineID and buildNumber in order to identify the build data that is to be deleted. On receiving the call the issue tracking RS 102 identifies the specified build information (i.e. build information with the specified pipelineId and buildNumber) and deletes it.

Delete Builds by Property

The table below provides a specific example of a delete builds by key API call (in cURL format):
curl--request DELETE\
    --url 'https://<receiving system url>/rest/rest/builds/0.1/bulkByProperties'

In this case one or more properties are defined (e.g. DELETE /bulkByProperties?accountId=<123>&createdBy=<456>). On receiving the call the issue tracking RS 102 identifies the specified build information (i.e. build information matching all defined properties) and deletes it.

Get Build by Key

The table below provides a specific example of a get build by key API call (in cURL format):
curl--request GET\
    --url 'https://<receiving system url>/rest/rest/builds/0.1/pipelines/{pipelineId}/builds/{buildNumber}'\
    --header 'Accept: application/json'

In this example, the build information is identified by a pipelineID and buildNumber. In response to a valid get build by key call, the issue tracking RS 102 identifies and returns the build information associated with the specified build (for example using the submit build update schema described above). A call such as this may be made, for example, to review the build data that has been submitted by the build SS 120 and/or to confirm that a delete operation was successful.

In the above description, operations performed by the RS 102 are described as being performed by specific components thereof. In alternative implementations, the RS operations can be performed by a single component, or multiple components (additional and/or alternative to the components described above). Similarly, operations performed by the SS 120 could be performed by one or more alternative and/or additional components.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for sending data over an untrusted network from a first backend system providing server-side functionality supporting a first client application executable by a client device to a second backend system providing server-side functionality supporting a second client application executable by the client device, the method comprising:
   by the first backend system:
      detecting occurrence of a data communication trigger event originating from the first client application executing on the client device, the first client application in communication with the first backend system;
      in response to detecting occurrence of the data communication trigger event, determining a backend system integration that the data communication trigger event relates to;
      accessing credentials associated with the backend system integration;
      determining an event data communication format based on an application programming interface (API) of the second backend system that is associated with the data communication trigger event and the backend system integration;
      generating an event message formatted according to the event data communication format, the event message comprising:
         first backend system data generated by the first backend system; and
         a second backend system data identifier identifying data stored by the second backend system that is to be associated with the first backend system data; and
      communicating the event message to the second backend system, via the backend system integration, using the credentials associated with the backend system integration.

2. The computer-implemented method according to claim 1, wherein prior to attempting to communicate the event message to the second backend system the method further comprises:
   attempting to establish a connection with the second backend system using the credentials associated with the backend system integration;
   determining if the attempt to establish the connection with the second backend system was successful; and
   in response to determining that the attempt to establish the connection with the second backend system was successful, attempting to communicate the event message to the second backend system.

3. The computer-implemented method according to claim 2, wherein in response to determining that the attempt to establish the connection with the second backend system was not successful, the method further comprises:
   generating a connection failed message indicating that the credentials associated with the backend system integration do not provide access to the second backend system; and
   foregoing attempting to communicate the event message to the second backend system.

4. The computer-implemented method according to claim 1, wherein after attempting to communicate the event message to the second backend system the method further comprises:
   determining whether the attempt to communicate the event message to the second backend system was successful; and
   in response to determining that the attempt to communicate the event message to the second backend system was not successful, generating an event communication failed message indicating that the first backend system does not have access to a second backend system API required to communicate the event message.

5. The computer-implemented method according to claim 1, wherein the second backend system is an issue tracking system and the second backend system data identifier is an issue identifier that identifies an issue maintained by the second backend system.

6. The computer-implemented method according to claim 1, wherein the data communication trigger event relates to a software build.

7. The computer-implemented method according to claim 1, wherein the data communication trigger event relates to a software deployment.

8. A computer-implemented method for receiving data from a first backend system at a second backend system over an untrusted network, the method comprising:
   by the second backend system:
      receiving an event message from the first backend system, the event message including first backend system data and a second backend system data identifier;
      determining a second backend system API associated with the event message;
      determining whether the first backend system is permitted to use the second backend system API; and
      in response to determining that the first backend system is permitted to use the second backend system API, processing the event message by:
         determining particular second backend system data associated with the second backend system data identifier
         storing the first backend system data at a data store of the second backend system; and
         associating the stored first backend system data with the particular second backend system data.

9. The computer-implemented method according to claim 8, wherein in response to determining that the first backend system is not permitted to use the second backend system API, the method comprises foregoing processing the event message.

10. The computer-implemented method according to claim 8, wherein prior to receiving the event message from the first backend system, the method further comprises:
   receiving, at the second backend system, an attempt by the first backend system to establish a connection with the second backend system using credentials;
   determining, by the second backend system, if the credentials are valid; and
   in response to determining that the credentials are not valid:
   refusing the connection with the first backend system; and
   not receiving the event message.

11. The computer-implemented method according to claim 8, wherein the second backend system is an issue tracking system and the particular second backend system data is an issue maintained by the second backend system.

12. A computer processing system comprising:
   a processing unit;
   a communication interface; and
   a non-transient computer-readable storage medium storing sequences of instructions, which when executed by the processing unit, cause the processing unit to:
      detect occurrence of a data communication trigger event;

in response to detecting occurrence of the data communication trigger event, determine a backend system integration that the data communication trigger event relates to;

access credentials associated with the backend system integration;

determine an event data communication format based on an API of the backend system that is associated with the data communication trigger event and the backend system integration;

generate an event message formatted according to the event data communication format, the event message comprising:
- first backend system data generated by the computer processing system; and
- a backend system data identifying data stored by the backend system that is to be associated with the first backend system data; and attempt to communicate the event message to a second backend system using the credentials associated with the backend system integration.

13. The computer processing system according to claim 12, wherein prior to attempting to communicate the event message to the second backend system, the sequences of instructions, when executed by the processing unit, cause the processing unit to:

attempt to establish a connection with the second backend system using the credentials associated with the backend system integration;

determine if the attempt to establish the connection with the second backend system was successful; and in response to determining that the attempt to establish the connection with the second backend system was successful, attempt to communicate the event message to the second backend system.

14. The computer processing system according to claim 13, wherein in response to determining that the attempt to establish the connection with the second backend system was not successful, the sequences of instructions, when executed by the processing unit, cause the processing unit to:

generate a connection failed message indicating that the credentials associated with the backend system integration do not provide access to the second backend system; and forego attempting to communicate the event message to the second backend system.

15. The computer processing system according to claim 12, wherein after attempting to communicate the event message to the second backend system, the sequences of instructions, when executed by the processing unit, cause the processing unit to:

determine whether the attempt to communicate the event message to the second backend system was successful; and in response to determining that the attempt to communicate the event message to the second backend system was not successful, generate an event communication failed message indicating that the first backend system does not have access to a second backend system API required to communicate the event message.

16. The computer processing system according to claim 12, wherein determining an event data communication format comprises determining a second backend system API that is associated with the backend system integration and the data communication trigger event, the second backend system API defining the event data communication format.

17. The computer processing system according to claim 12, wherein generating the event message comprises:

determining a second backend system data identifier that identifies particular data that is maintained by the second backend system and that the first backend system data is intended to be associated with; and including the second backend system data identifier in the event message.

18. The computer processing system according to claim 17, wherein the second backend system is an issue tracking system and the second backend system data identifier is an issue identifier that identifies an issue maintained by the second backend system.

* * * * *